(12) United States Patent
Masuda et al.

(10) Patent No.: US 9,084,939 B2
(45) Date of Patent: *Jul. 21, 2015

(54) GAMING MACHINE, GAMING METHOD, AND GAMING PROGRAM

(75) Inventors: Hiroyuki Masuda, Kobe (JP); Mitsuhiro Nozaki, Kobe (JP); Yoshito Fukuda, Kobe (JP); Masanori Kono, Kobe (JP)

(73) Assignee: KONAMI DIGITAL ENTERTAINMENT CO., LTD., Tokyo (JP)

( * ) Notice: Subject to any disclaimer, the term of this patent is extended or adjusted under 35 U.S.C. 154(b) by 857 days.

This patent is subject to a terminal disclaimer.

(21) Appl. No.: 12/755,156

(22) Filed: Apr. 6, 2010

(65) Prior Publication Data

US 2010/0197398 A1 Aug. 5, 2010

Related U.S. Application Data

(63) Continuation of application No. PCT/JP2008/067698, filed on Sep. 30, 2008.

(30) Foreign Application Priority Data

Oct. 9, 2007 (JP) .................................. 2007-263125

(51) Int. Cl.
*A63F 9/24* (2006.01)
*A63F 13/218* (2014.01)
(Continued)

(52) U.S. Cl.
CPC ............... *A63F 13/218* (2014.09); *A63F 13/10* (2013.01); *A63F 13/214* (2014.09);
(Continued)

(58) Field of Classification Search
CPC ....... A63F 13/00; A63F 13/005; A63F 13/10; A63F 2300/63; A63F 2300/638; A63F 2300/1062; A63F 2300/8047; A63F 13/06; A63F 13/08; A63F 13/20; A63F 13/214; A63F 13/2145; A63F 13/44; A63F 13/46; A63F 13/50

USPC ........................ 463/7, 9, 23, 30, 31, 36, 37, 1
See application file for complete search history.

(56) References Cited

U.S. PATENT DOCUMENTS 3,757,322 A * 9/1973 Barkan et al. ................. 345/174
4,207,087 A * 6/1980 Morrison et al. ................. 463/9
(Continued)

FOREIGN PATENT DOCUMENTS

JP 56-152670 A 11/1981
JP 2922509 B2 4/1999
(Continued)

OTHER PUBLICATIONS

Notice of Rejection of the corresponding Japanese Application No. 2009-536977, Dated Jun. 7, 2011.
(Continued)

*Primary Examiner* — William H McCulloch, Jr.
*Assistant Examiner* — Chase Leichliter
(74) *Attorney, Agent, or Firm* — Global IP Counselors, LLP

(57) ABSTRACT

A gaming machine is provided which includes: at least one operation means that accepts an input operation performed by a player when pressing down on the at least one operation means; at least one display unit having a display the player is able to see through the surface of the operation means; operation-instruction-mark output means that outputs an operation instruction mark for signaling an input timing the player performs an input operation, to the display unit for each of the operation means; evaluation means that evaluates a game score of the player based on comparison between the input-timing and an operation timing the player performed the input operation, the operation-instruction-mark output means starting to control an output of the operation instruction mark a predetermined period of time ta before the input timing, so as to change a form of the operation instruction mark little by little for the predetermined period of time ta until the input timing.

17 Claims, 18 Drawing Sheets

(51) Int. Cl.
  *A63F 13/214* (2014.01)
  *A63F 13/2145* (2014.01)
  *A63F 13/44* (2014.01)
  *A63F 13/40* (2014.01)
  *A63F 13/00* (2014.01)
  *A63F 13/20* (2014.01)
  *A63F 13/46* (2014.01)
  *A63F 13/50* (2014.01)
  *A63F 13/90* (2014.01)

(52) U.S. Cl.
  CPC ............ *A63F 13/2145* (2014.09); *A63F 13/44* (2014.09); *A63F 13/00* (2013.01); *A63F 13/06* (2013.01); *A63F 13/08* (2013.01); *A63F 13/20* (2014.09); *A63F 13/46* (2014.09); *A63F 13/50* (2014.09); *A63F 2300/1075* (2013.01); *A63F 2300/638* (2013.01); *A63F 2300/8047* (2013.01)

(56) References Cited

U.S. PATENT DOCUMENTS

| | | | | |
|---|---|---|---|---|
| 4,930,074 A * | 5/1990 | McCarthy | ............... | 463/31 |
| 5,411,271 A * | 5/1995 | Mirando | ............... | 463/9 |
| 6,325,715 B1 * | 12/2001 | Nagata | ............... | 463/5 |
| 6,379,244 B1 | 4/2002 | Sagawa et al. | | |
| 6,461,239 B1 | 10/2002 | Sagawa et al. | | |
| 6,607,446 B1 * | 8/2003 | Shimomura et al. | ............ | 463/43 |
| 6,620,042 B1 * | 9/2003 | Nagata | ............... | 463/5 |
| 6,638,160 B2 * | 10/2003 | Yoshitomi | ............ | 463/7 |
| 6,913,536 B2 * | 7/2005 | Tomizawa et al. | ............ | 463/43 |
| 7,060,000 B2 * | 6/2006 | Carlson | ............... | 482/1 |
| 7,452,336 B2 * | 11/2008 | Thompson | ............ | 600/558 |
| 7,628,699 B2 * | 12/2009 | Onoda et al. | ............ | 463/36 |
| 2002/0137566 A1 | 9/2002 | Tomizawa et al. | | |
| 2006/0287088 A1 * | 12/2006 | Mashimo et al. | ............ | 463/37 |
| 2007/0060351 A1 * | 3/2007 | Paratore et al. | ............ | 463/35 |
| 2008/0146312 A1 | 6/2008 | Yamazaki et al. | | |
| 2008/0192300 A1 * | 8/2008 | Kenji | ............ | 358/3.29 |

FOREIGN PATENT DOCUMENTS

| | | |
|---|---|---|
| JP | 2000-084233 A | 3/2000 |
| JP | 3392120 B2 | 1/2003 |
| JP | 2005-006741 A | 1/2005 |
| JP | 2005-143714 A | 6/2005 |
| TW | 200635643 | 10/2008 |

OTHER PUBLICATIONS

The Taiwanese Office Action in corresponding Taiwanese Application No. 097138554, dated Nov. 23, 2011.

PCT/ISA/210 of International Application No. PCT/JP2008/067698, dated Dec. 9, 2008.

* cited by examiner (a)

| 5 | 6 | 7 | 8 |
|---|---|---|---|
| 16 | 1 | 2 | 9 |
| 15 | 3 | 4 | 10 |
| 14 | 13 | 12 | 11 |

← 114

(b)

| TIME | OPERATION UNIT NO | | | | |
|---|---|---|---|---|---|
| | 1 | 2 | 3 | .... | 16 |
| t0 | 0 | 0 | 1 | .... | 0 |
| t1 | 0 | 1 | 0 | .... | 1 |
| t2 | 0 | 0 | 0 | .... | 0 |
| t3 | 1 | 0 | 0 | .... | 1 |
| t4 | 0 | 0 | 1 | .... | 0 |
| t5 | 1 | 1 | 0 | .... | 0 |
| t6 | 0 | 0 | 0 | .... | 1 |
| t7 | 1 | 0 | 0 | .... | 0 |
| t8 | 0 | 0 | 0 | .... | 0 |
| t9 | 1 | 0 | 0 | .... | 0 |
| t10 | 0 | 0 | 1 | .... | 0 |
| t11 | 0 | 1 | 0 | .... | 0 |
| t12 | 0 | 0 | 1 | .... | 1 |
| t13 | 0 | 0 | 0 | .... | 0 |
| t14 | 0 | 1 | 0 | .... | 0 |
| t15 | 1 | 0 | 0 | .... | 0 |
| t16 | 0 | 0 | 1 | .... | 0 |
| t17 | 0 | 0 | 1 | .... | 0 |
| t18 | 1 | 0 | 0 | .... | 0 |
| t19 | 0 | 0 | 0 | .... | 1 |
| t20 | 0 | 1 | 0 | .... | 0 |
| ⋮ | ⋮ | ⋮ | ⋮ | .... | ⋮ |

FIG. 7

| OUTPUT FORM ID | FILE NAME |
|---|---|
| 0001 | file_a |
| 0002 | file_b |
| 0003 | file_c |
| ⋮ | ⋮ |

FIG. 8

| DIFFICULTY LEVEL | OPERATION SEQUENCE ID | OUTPUT FORM ID |
|---|---|---|
| 1 | 1001 | 0001 |
| 2 | 1002 | 0002 |
| 3 | 1002 | 0003 |
| ⋮ | ⋮ | ⋮ |

FIG. 9

| OPERATION UNIT NO | PREDETERMINED TIME ta(s) | PREDETERMINED TIME tb(s) |
|---|---|---|
| 1~4 | 5 | 2 |
| 6~7, 9~10 12~13, 15~16 | 8 | 3 |
| 5, 8, 11, 14 | 10 | 5 |

FIG. 16

| DIFFICULTY LEVEL | PREDETERMINED TIME ta(s) | PREDETERMINED TIME tb(s) |
|---|---|---|
| 1 | 10 | 5 |
| 2 | 9.5 | 4.5 |
| 3 | 9 | 4 |
| ⋮ | ⋮ | ⋮ |

FIG. 17

GAMING MACHINE, GAMING METHOD, AND GAMING PROGRAM

TECHNICAL FIELD

The present invention relates to a gaming machine, a gaming method, and a gaming program.

BACKGROUND ART

There is a gaming machine for a so-called Whac-A-Mole game provided with a playing board having a plurality of holes from which targets randomly emerge. In the Whac-A-Mole game, a player hits mechanical moles or like targets with, for example, a hammer before the targets return to the holes. Since the targets randomly emerge from the holes of the entire board, the player is required to have good hand-eye coordination to quickly find and hit the exposed target. The gaming machine is designed to evaluate a game scores based on the number of targets the player hit during a predetermined period of time. Players are able to compete using their good hand-eye coordination represented by the game scores.

DISCLOSURE OF INVENTION

In the above Whac-A-Mole game, players simply hit the targets, but the time it takes to hit a target is not reflected in the game score. A player may hit the target at any timing before the target returns to the hole after it emerges from the hole. As a result, in the Whac-A-Mole game, a player is required to have good hand-eye coordination to hit an emerging target, but a game consisting of hitting targets is somewhat tedious.

Technical Problem

More targets require better hand-eye coordination. With too many targets, however, it is difficult for a player having excellent hand-eye coordination to hit all of the targets. The player may give up the game loosing interest in being challenged by the game. Alternatively, more targets may emerge for longer period of time, which then decreases the fun factor of the game.

The present invention is directed to provide a technology to increase the fun of the game.

To solve the above problem, a first aspect of the present invention provides a gaming machine comprising: at least one operation means that accepts an input operation when performed by a player pressing down on the at least one operation means; at least one display unit having a display the player is able to see through surface of the operation means; operation-instruction-mark output means that outputs an operation instruction mark for signaling to the player an input timing such that the player should perform the input operation using the operation means, to the display unit for each of the operation means; and evaluation means that evaluates a game score of the player based on comparison between the input timing and an operation timing that corresponds to the moment of the input operation by the player, the operation-instruction-mark output means starts to control an output of the operation instruction mark at a predetermined period of time ta before the input timing, so as to change a form of the operation instruction mark little by little for the predetermined period of time ta until the input timing.

According to the present invention, the changing of a form of an operation instruction mark is started at a predetermined period of time ta before an input timing, so that a waiting time before the input timing is indicated. This allows a player to select and estimate an input timing of operation means, and thereby the player can enjoy matching between the operation timing with the input timing. The operation instruction mark is displayed in a form that changes gradually, which is enjoyable to the player. The form of the operation instruction mark is increased or decreased in size for example until an input timing. Alternatively, the operation instruction mark may be changed into a predetermined form until an input timing.

The display of a display unit to which the operation instruction mark is output can be seen through surface of the operation means. This allows a player to check an operation instruction mark and operate the operation means in series, without moving the player's line of sight to the display unit.

According to the present invention, as described above, a player is able to estimate operation means to operate and an input timing of the operation means, and operate the operation means without moving the player's line of sight. As a result, an increase in the number of the operation means does not decreases the interest of the player to the game because a play can follow the game. Rather, the increase in the number of the operation means leads to wider varieties of the game, enhancing the interest of the player to the game. In this way, according to the present invention, the gaming machine has advantages of increased number of operation means while overcoming the disadvantages thereof.

In addition, according to the present invention, a player performs an input operation by a press-down of operation means, and thereby the player can enjoy the actual feeling of operation of the operation means according to the progression of the game.

When operation instruction marks are output to the display unit to make a player to operate a plurality of operation means at one timing, a new entertainment of the operation of a plurality of operation means at one timing is provided. The actual feeling of pressing makes it sure for the player that he/she is operating a plurality of operation means when the player should operate the plurality of operation means at the same timing. Similar effect can be obtained when a player operates a plurality of operation means at timings close to one another.

A second aspect of the present invention provides the gaming machine in the first aspect, wherein the operation-instruction-mark output means further controls the output of the operation instruction mark by changing a form of the operation instruction mark little by little even after the input timing for a predetermined period of time tb.

The operation instruction mark has a form that changes little by little even after the input timing. This allows a player to know how much the operation timing was behind the input timing, in the case where the input operation was made after the input timing.

A third aspect of the present invention provides the gaming machine in the first or second aspect, wherein the evaluation means evaluates a game score of the player based on a difference between the input timing and the operation timing.

The game score varies depending on a player's skill, and so the player enjoys the game by trying to operate the operation means at a timing as close as possible to the input timing. For example, in the case with a little difference between the input timing and the operation timing, the game machine determines that the player appropriately responds to the operation instruction mark, and provides the player with a high score.

A fourth aspect of the present invention provides the gaming machine in the third aspect, wherein the evaluation means evaluates a game score of the player based on a difference between the input timing and the operation timing in the case where the operation timing occurs during the predetermined period of time to before the input timing.

If a player can estimate an input timing but does not operate the operation means during a predetermined period of time ta before the input timing, no game score is evaluated. This gives feeling of tension to the player, resulting in enhanced entertainment of the game.

A fifth aspect of the present invention provides the gaming machine in the first aspect, wherein the operation instruction mark is composed of a combination of display patterns, each pattern being a part of the operation instruction mark, and the operation-instruction-mark output means changes the form of the operation instruction mark by outputting each of the display patterns in steps to each of a plurality of areas in the display for a predetermined period of time ta until the input timing.

Accordingly, a player can enjoy the change in the form of the operation instruction mark, in addition to check the operation instruction mark. For example, an area of an operation instruction mark to be displayed is increased as the input timing is approaching. In this case, a player can expect the input timing based on the time when the operation instruction mark has a maximum display area. The operation-instruction-mark output means may control the operation instruction mark to have a decreasing display area as the input timing is approaching.

A sixth aspect of the present invention provides the gaming machine in the first aspect, wherein the display unit is provided with an upper surface having a plurality of the operation means, and the display unit has a plurality of display areas corresponding to each of the operation means.

For example, one display unit is provided with 16 operation means, and on the display unit, operation instruction marks corresponding to each of the operation means are displayed. Only one display unit can accommodate the plurality of operation means, resulting in a reasonable cost to manufacture the game machine.

A seventh aspect of the present invention provides the gaming machine in the first aspect, wherein the display unit is provided on each of the operation means.

The display unit is provided on each of the operation means, and thereby the display unit and the operation means can be integrally formed. Accordingly, a player feels like operating the operation means while operating the display unit, as a new feeling experience.

An eighth aspect of the present invention provides the gaming machine in the first aspect further comprising the operation means has a plurality of contacts corresponding to inclinations of the pressed operation means, and the gaming machine further includes detection means disposed under the operation means to contact with the contacts when the operation means is pressed down, and the evaluation means determines whether or not the operation means with which the input operation was performed by the player matches with the operation means instructed by the operation instruction mark, based on a contact between one of the contacts and the detection means, determines a matching degree between an operation timing of the input operation by the player and the input timing, and evaluates a game score of the player based on the determination result.

When a player presses down one operation means, the operation means may be lowered vertically or may be lowered at an angle. The plurality of contacts each corresponding to the inclination of the operation means enables accurate detection of the operations of the operation means by the player.

A ninth aspect of the present invention provides the gaming machine in the first aspect, wherein the operation-instruction-mark output means sets the predetermined period of time ta for each of the operation means.

Setting the predetermined period of time ta for each of the operation means increases the varieties of input timing, and the diversity of the game. This eventually enhances the interest of a player to the game.

A tenth aspect of the present invention provides the gaming machine in the ninth aspect, wherein the operation-instruction-mark output means sets the predetermined period of time ta according to a position of the operation means.

It is more difficult for a player to check the position of operation means away from the center of the player's line of sight and the input-timing thereof than in the case of the operation means around the center of the player's line of sight. Therefore, a longer predetermined period of time ta is set for the operation means farther away from the center of the player's line of sight. This allows a player to operate the operation means away from the center of the player's line of sight comparably to the operation means around the center of the player's line of sight.

An eleventh aspect of the present invention provides the gaming machine in the ninth aspect, wherein, according to a difficulty level of the game, for example for a game of a higher difficulty level, the operation-instruction-mark output means reduces the predetermined period of time ta and reduces the waiting time between the display of an operation instruction mark and the input-timing. This increases sense of tension of a player, and the diversity of the game, enhancing the interest of a player to the game.

A twelfth aspect provides a gaming method executed by a gaming machine including at least one operation means that accepts an input operation when performed by a player by pressing down on the at least one operation means and at least one display unit having a display the player is able to see through surface of the operation means. The method includes: an operation instruction mark outputting step of outputting an operation instruction mark that indicates an input timing of an input operation using the operation means, to the display unit for each of the operation means; and an evaluation step of evaluating a game score of the player based on comparison between the input timing and an operation timing of the input operation by the player, and the operation instruction mark outputting step includes: starting to control an output of the operation instruction mark at a predetermined period of time ta before the input timing, so as to change a form of the operation instruction mark little by little for the predetermined period of time ta until the input timing.

A thirteenth aspect provides a gaming program executed by a computer terminal including at least one operation means that accepts an input operation when performed by a player pressing down on the at least one operation means and at least one display unit having a display the player is able to see through surface of the operation means. The gaming program makes the computer terminal to function as operation-instruction-mark output means that outputs an operation instruction mark for signaling an input timing to the player such that the player should perform the input operation using the operation means, to the display unit for each of the operation means, and evaluation means that evaluates a game score of the player based on comparison between the input timing and an operation timing of the input operation performed by the player, and the operation-instruction-mark output means starts to control an output of the operation instruction mark at a predetermined period of time ta before the input timing, so as to change a form of the operation instruction mark gradually for the predetermined period of time ta until the input timing.

A fourteenth aspect provides a gaming machine including: a plurality of transparent operation means that each accepts an input operation performed by a player when the player presses down on the transparent operation means: at least one display unit that is disposed under the operation means and has a display surface that the player can see through, the display having a plurality of display areas corresponding to the plurality of the operation means; operation-instruction-mark output means that outputs an operation instruction mark indicating that a selected ones of the display areas is a target, the operation-instruction-mark output means signaling an input timing of the input operation using the each of the operation means, to the display unit for each of the operation means; a plurality of contacts corresponding to each of the operation means; detection means disposed under the operation means to contact with the contacts when the operation means is pressed down; evaluation means that determines whether or not the operation means with which the input operation was performed by the player matches with the operation means instructed by the operation instruction mark based on a contact between one of the contacts and the detection means, determines a matching degree between an operation timing of the input operation by the player and the input timing, and evaluates a game score of the player based on the determination result, the operation-instruction-mark output means starts to control an output of the operation instruction mark at a predetermined period of time ta before the input timing, so as to change a form of the operation instruction mark little by little for the predetermined period of time ta until the input timing.

Because each of the operation means is provided with a plurality of contacts, when one of the plurality of contacts is brought in contact with the detection means, a press-down of the operation means by the player can be detected. As a result, operations of the operation means by a player can be accurately detected. Even in the case where a plurality of operation means is operated at timings close to one another, press-downs of the operation means can be accurately detected. For example, in the case where one operation means is pressed down at timings close to one another, the pressings may be at angles due to high speed thereof. Furthermore, in the case where a plurality of operation means are operated at timings close to one another, the situation that the pressings of the operation means are at angles due to the shifting of a player's hands for the pressing increases. For example, the situation is in the case where a plurality of operation means arranged in a matrix are operated in a vertical, horizontal, or diagonal direction in series at timings close to one another. The plurality of contacts provided for each of the operation means, however, can detect any operation of the operation means when at least one of the contacts is brought into contact with the detection means. Accordingly, even when the operation means is pressed down at an angle, the operation of the operation means by a player can be accurately detected. Similar effect can be obtained when a player operates a plurality of operation means at one timing.

Advantageous Effects

According to the present invention, a technology is provided to increase the fun of the game.

BRIEF DESCRIPTION OF DRAWINGS

FIG. 7(*a*) is a schematic view of operation units 114 according to an embodiment of the present invention, each with an operation unit number.

FIG. 7(*b*) illustrates an example of operation sequence data stored in an operation sequence data table 211.

FIG. 8 illustrates an example of an output-form storage means 212.

FIG. 9 illustrates an example of an association table 213.

FIG. 16 illustrates an example of a time table 214 (1).

FIG. 17 illustrates another example of the time table 214 (2).

Figure 1:
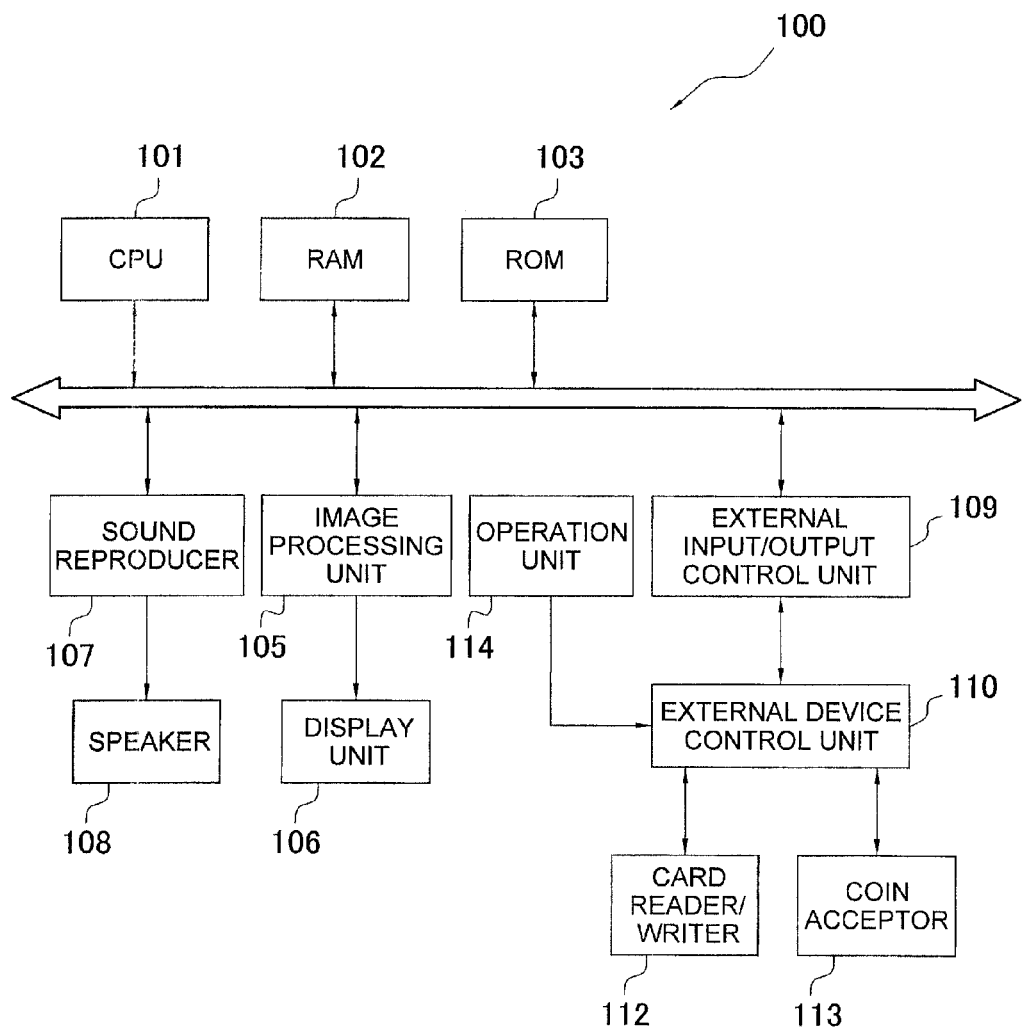
FIG. 1 illustrates an example of a configuration of a gaming machine terminal 100.

EXPLANATION OF REFERENCE 100 gaming machine terminal
101 CPU
102 RAM
103 ROM
106, 131, 132 display unit
114 operation unit
120 upper rubber contact
121 button
122 lower rubber contact
123 frame
124 substrate
124*a* contact
125 acrylic plate
126 back plate

BEST MODE FOR CARRYING OUT THE INVENTION

First Embodiment (1) Gaming Machine Terminal According to this Embodiment

FIG. 1 illustrates a configuration of a gaming machine terminal 100. The gaming machine terminal 100 includes the following components (a) to (n).

(a) CPU 101: for achieving a plurality of functions which is described below, based on a control program or game data stored in an ROM 103 which is described below.

(b) RAM 102: for temporarily storing various game data such as different variables and parameters.

(c) ROM 103: for storing control programs and various parameters.

(d) Speaker 108: for outputting sound such as sound effects during a game, when a demonstration display unit is displayed, when a game score is displayed, or the like.

(e) Sound Reproducer 107: for generating sound data to be outputted to the speaker 108.

(f) Display Unit 106: for displaying operation instruction marks, decorative lights during a game, game score, demonstration display unit, and the like. The operation instruction mark indicates an input timing at which a player should perform an input operation using operation units 114.

(g) Operation Units 114: as one or more operation units 114, one or more press-type switches are provided on the display unit 106. The operation units 114 are made of a material that allows the display of the display unit 106 to be seen through the operation units 114. The operation units 114 also function as various buttons for selection and determination of a difficulty level of the game for example.

(h) Image Processing Unit 105: for generating image data to be displayed on the display unit 106.

(i) Card Reader/Writer 112: for reading a card ID of an inserted magnetic card. The card reader/writer 112 may perform writing of a player ID or a game score as needed.

(j) Coin Acceptor 113: for accepting a credit by inserted coins.

(k) External device control unit 110: for controlling to accept various inputs from external devices such as the card reader/writer 112, the coin acceptor 113, and the operation units 114.

(l) External input/output control unit 109: for generating control signals to external devices such as the card reader/writer 112, the coin acceptor 113, and the operation units 114. Also, the external input/output control unit 109 receives detection signals from external devices, and sends the signals to the CPU 101.

Figure 2:
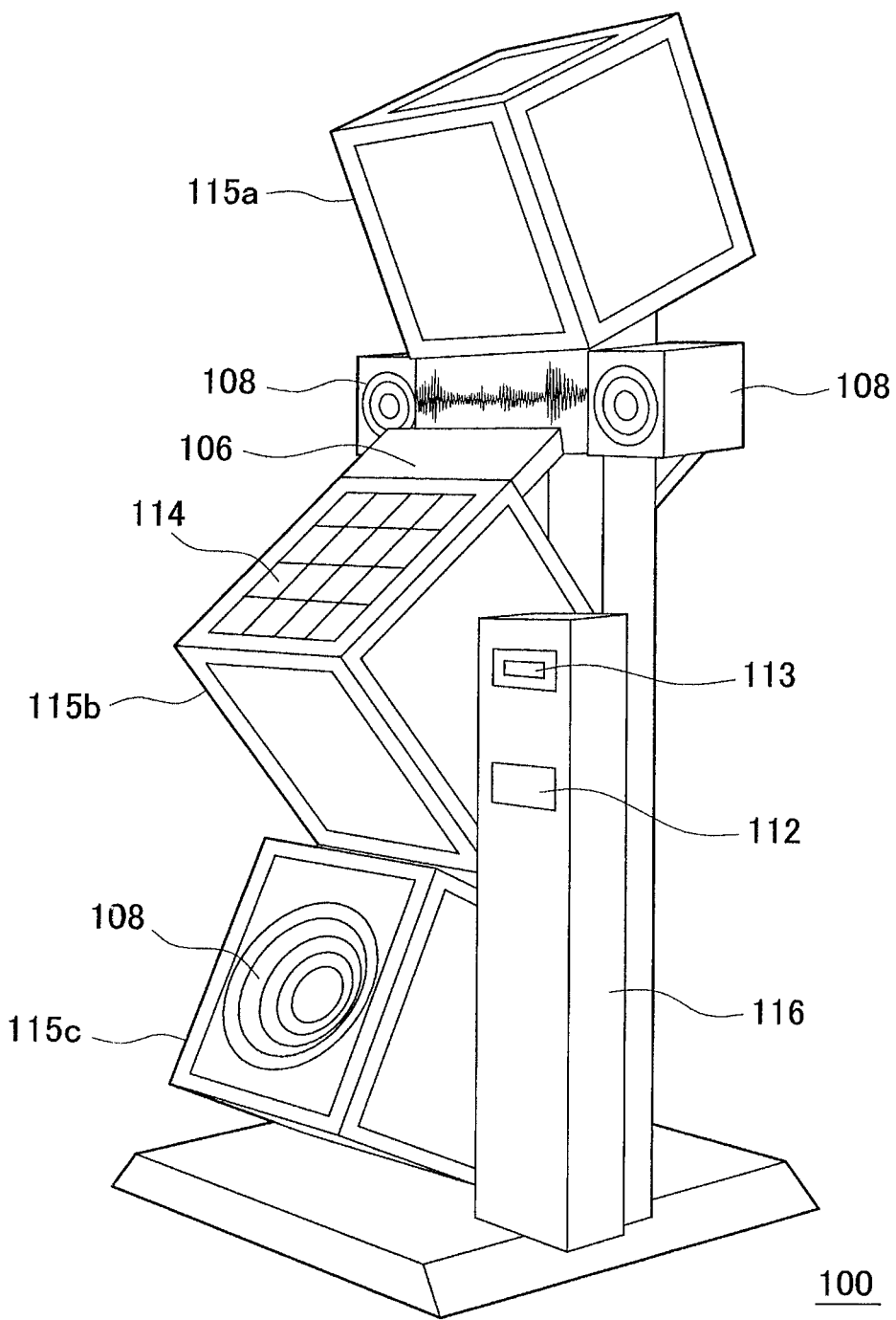
FIG. 2 is an external perspective view of an example of a gaming machine terminal 100.

(2) Example of Gaming Machine Terminal (2-1) Configuration of Gaming Machine Terminal FIG. 2 is an external perspective view of an example of the gaming machine terminal 100. The gaming machine terminal 100 includes upper, middle and lower cubic housings 115a, 115b, and 115c. The upper housing 115a is used, for example, for decoration or signs. The middle housing 115b is tilted so that a player can easily watch one surface thereof, the surface being integrally provided with the display unit 106 and the operation units 114. The lower housing 115c has the speaker 108 incorporated therein for sound effect for songs. Another speaker 108 is also installed between the housings 115a and 115b. Beside the housings 115a, 115b, and 115c, the other housing 116 is provided with the coin acceptor 113 and the card reader/writer 112.

Figure 3:
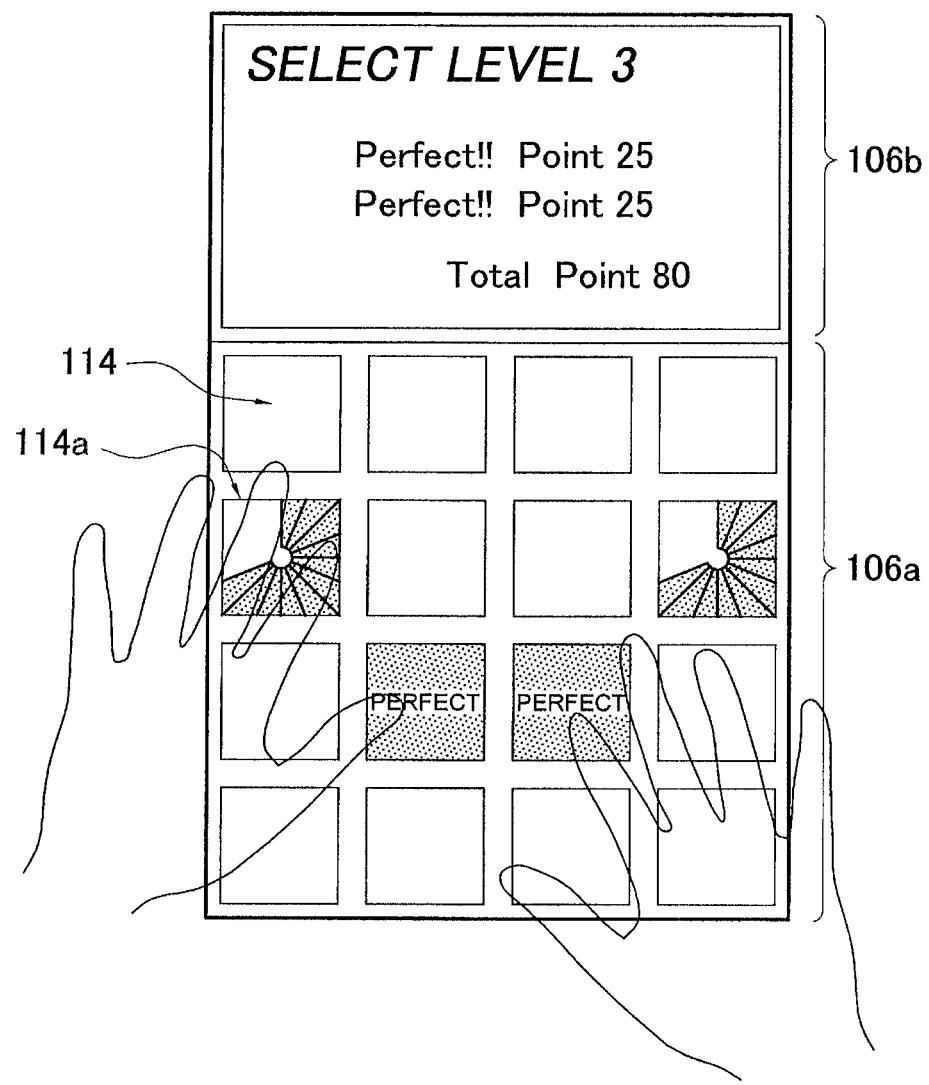
FIG. 3 is an external enlarged view of operation units 114 and a display unit 106.
Figure 4:
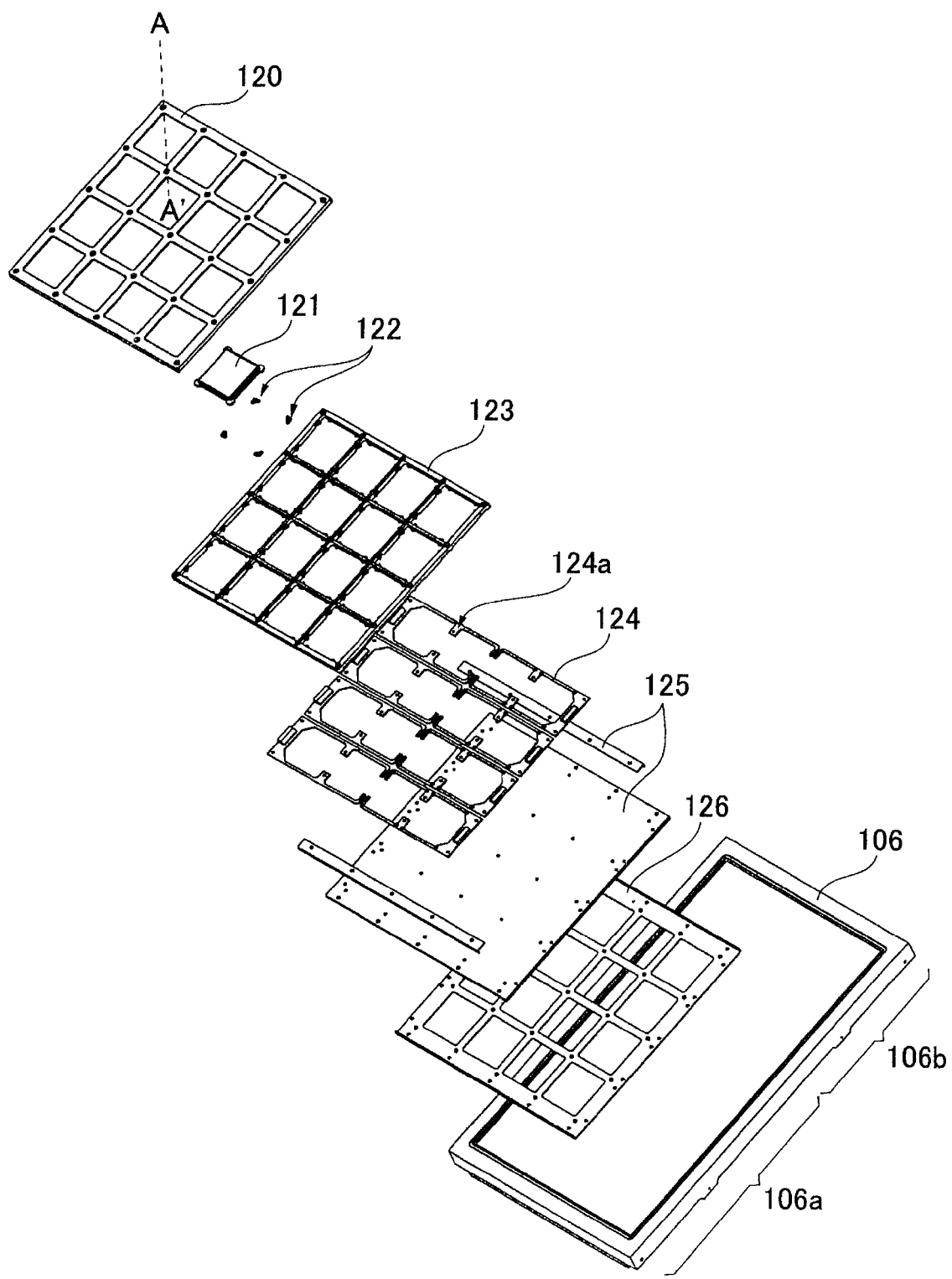
FIG. 4 is a exploded perspective view of the operation units 114 and the display unit 106.
Figure 5:
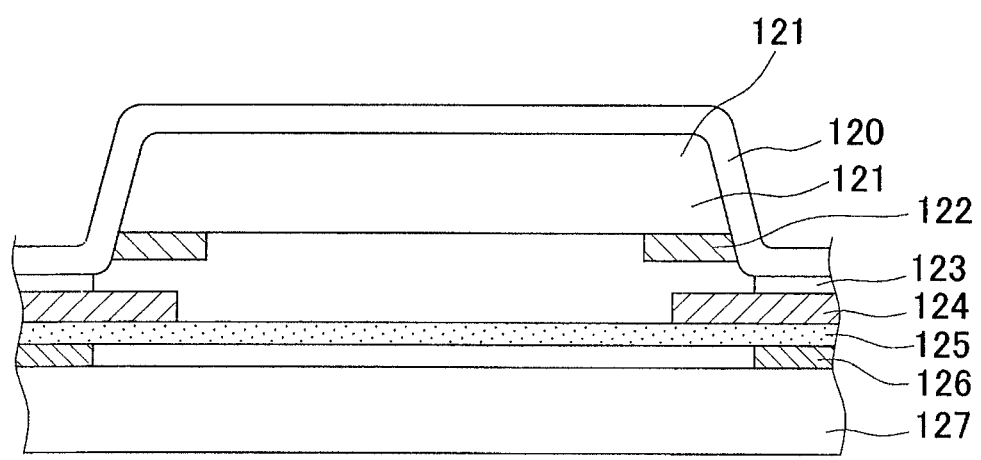
FIG. 5 is a cross-sectional view along the line A-A' in FIG. 4.

FIG. 3 is an external enlarged view of the operation units 114 and the display unit 106. FIG. 4 is a exploded perspective view of the operation units 114 and the display unit 106. FIG. 5 is a cross-sectional view along the line A-A' in FIG. 4.

The display unit 106 has a first area 106a to display operation instruction marks, and a second area 106b to display decorative lights, a game score, and demonstration display unit during a game. The display unit 106 can be, for example, a liquid crystal display, an organic EL display or a non-organic EL display.

As one or more operation units 114, one or more pressure sensitive buttons 121 are provided on the first area 106a of the display of the display unit 106. The operation units 114 are made of a transparent material for example so that a player can watch the display of the display unit 106 through the operation units 114. In the depicted embodiment, 16 operation units 114 are arranged in a matrix of four rows and four columns. The first area 106a of the display unit 106 is divided into sub-areas corresponding to the operation units 114 respectively, so that each of the substrate-areas displays an operation instruction mark corresponding to each of the operation units 114. In the depicted embodiment, the first area 106a of the display unit 106 is divided into sub-areas arranged in four rows and four columns in correspondence to the operation units 114 arranged in four rows and four columns. The number and arrangement of the operation units 114 and the sub-areas are not limited to those described above.

The buttons 121 are each provided thereon with an upper rubber contacts 120 that cushions the impact of pressing down or hitting, and protects the buttons 121. The upper rubbers contact 120 each have a projection corresponding to the buttons 121. The buttons 121 are each provided thereunder with a lower rubber contact 122 that can be brought in contact with contacts 124a of a substrate 124 which will be described later. For example, the buttons 121 each are a square shaped with four corners, each of the corners being provided with a lower rubber contact 122.

The buttons 121 are each provided thereunder, in sequence, with a frame 123, the substrate 124, an acrylic plate 125, and a back plate 126. The frame 123 secures each button 121 to be vertically movable. The substrate 124 has contacts 124a at positions respectively corresponding to the lower rubber contacts 122 of each button 121. Because of the plurality of lower rubber contacts 122 corresponding to the operation units 114 and the contacts 124a corresponding to the lower rubber contacts 122, when any of the plurality of lower rubber contacts 122 is brought into contact with one of the contacts 124a, pressure on the operation units 114 by a player can be detected. This enables accurate detection of the operation of the operation units 114 by a player. In the case where the plurality of operation units 114 are operated at timings close to one another also, pressure on the operation units 114 can be accurately detected. For example, in the case where one of the operation units 114 is pressed down at timings close to one another, each pressing of operation units 114 may be at an angle due to high speed thereof. Furthermore, in the case where a plurality of operation units 114 are operated at timings close to one another, the pressing of the operation units 114 are at a wider angle due to the shift of a player's hands for pressing contact. For example, the angle becomes wider in the case where the plurality of operation units 114 arranged in a matrix are operated in a vertical, horizontal, or diagonal direction in series at timings close to one another. The plurality of lower rubber contact 122 provided for each of the operation units 114, however, can detect any operation of the operation units 114 when at least one of the plurality of lower rubber contact 122 is brought into contact with the contacts 124a. Accordingly, even when the operation units 114 are each pressed down at an angle, the operation of the operation units 114 by a player can be accurately detected. Similar effect can be obtained when a player operates the plurality of operation units 114 at simultaneously.

The acrylic plate 125 suppresses heat transfer from the display unit 106 to the substrate 124, and protects the display unit 106 from damage caused by pressing or hitting of the buttons 121. The base plate 126 defines the sub-areas corresponding to the buttons 121 respectively in the first area 106a of the display unit 106, to prevent an operation instruction mark for one sub-area from being displayed on an adjacent sub-area.

In the depicted embodiment, the single display unit 106 is provided thereon with the 16 operation units 114, and an operation instruction mark corresponding to each of operation units 114 is displayed on each of the sub-areas of the display unit 106. Therefore, a plurality of operation instruction marks can be displayed on a plurality of sub-areas so that, for example, a plurality of operation units 114 are operated simultaneously. Alternatively, a plurality of operation instruction marks can be displayed on a plurality of sub-areas so that a plurality of operation units 114 are operated at timings close to one another.

As described above, the single display unit 106 can accommodate the plurality of operation units 114, resulting in a reasonable cost to manufacture the gaming machine terminal 100.

(2-2) Implementation of Game

The gaming machine terminal 100 configured as described above, implements a game in accordance with a control program stored in the ROM 203. A player inserts his/her own magnetic card into the card reader/writer 112 of the gaming machine terminal 100, and drops a coin into the coin acceptor 113. The gaming machine terminal 100 reads personal data from the magnetic card inserted into the card reader/writer 112. When the gaming machine terminal 100 accepts an instruction to start a game from the player, the CPU 101 executes the control program to start the game. The start of the game triggers the computation of a game score.

The personal data contains "player ID", "player's name", "Card ID", and "game score". The "player ID" is information for identifying a player. The "player's name" is the name of a player. The "Card ID" is information for identifying the card belonging to a player.

(2-3) Summary of Game

Flow of the game implemented in the gaming machine terminal 100 is now described below. First, the gaming machine terminal 100 accepts a difficulty level of the game from a player that indicates difficulty of the game. Alternatively, the gaming machine terminal 100 can set a difficulty level of the game based on game scores the player already obtained.

Next, operation sequence data corresponding to the difficulty level is selected. The operation sequence data is a program that determines which the operation unit 114 is to be the next target and an input timing to hit or be pressed. According to the operation sequence data, an operation instruction mark is displayed on a sub-area corresponding to the operation unit 114 that is to be the next target. The gaming machine terminal 100 changes the shape of the operation instruction mark in each sub-area to visually inform the player of an input timing. For example, as illustrated in the operation units 114a in FIG. 3, as the input timing is approaching, a display area of an operation instruction mark is increased little by little, so that the input timing is indicated to the player as a maximum display area of the operation instruction mark.

The player checks the operation instruction mark displayed on each sub-area through surface of the corresponding operation unit 114. Then, the player performs an input operation on the operation unit 114 corresponding to the sub-area with the operation instruction mark, by pressing down or hitting the operation unit 114 in response to the operation instruction mark while the operation instruction mark is displayed. The gaming machine terminal 100 evaluates a game score of the player based on the input operation.

(3) Functional Configuration of Gaming Machine Terminal

Figure 6:
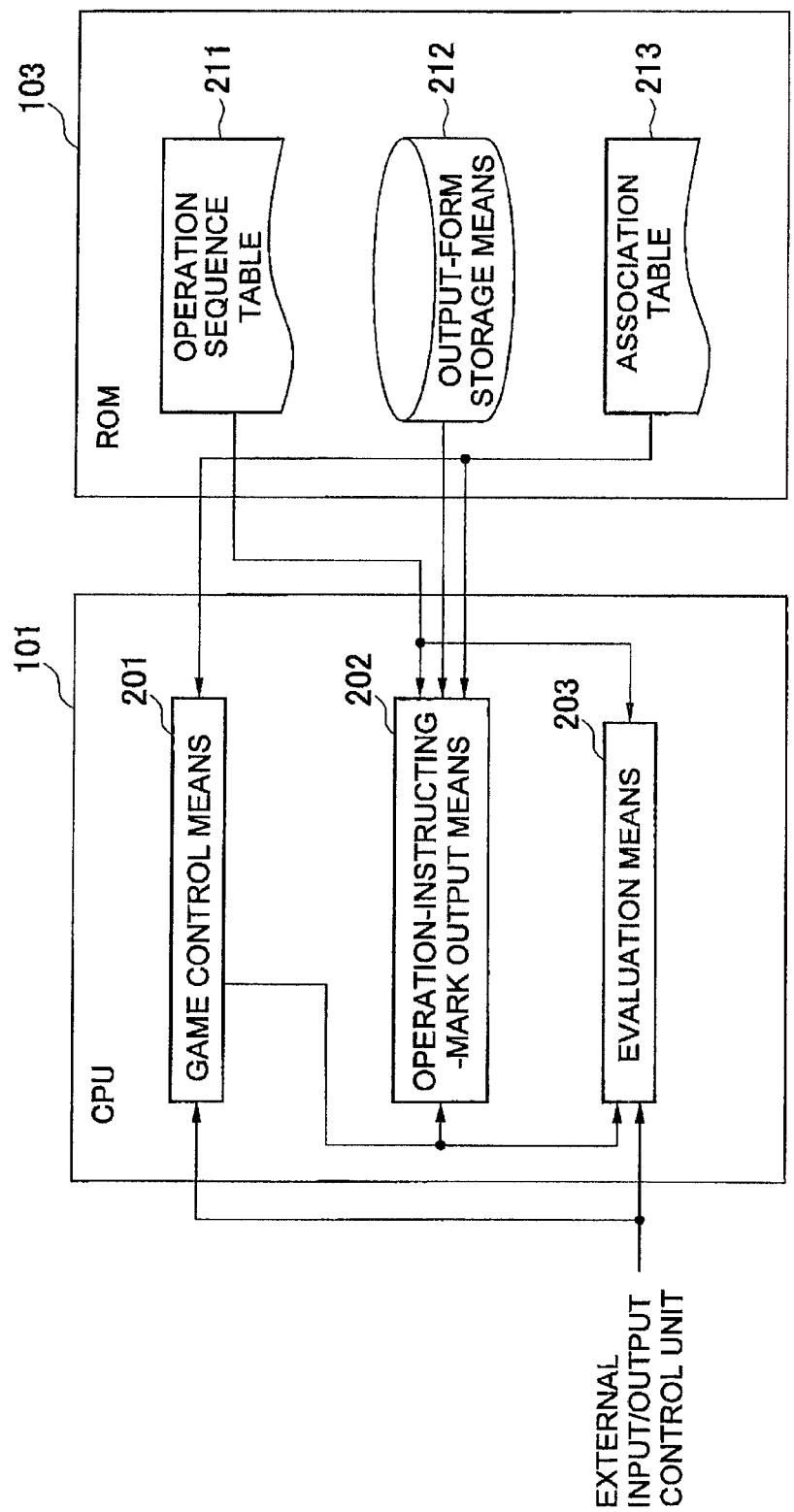
FIG. 6 illustrates a functional configuration of the gaming machine terminal 100 according to an embodiment of the present invention.

FIG. 6 illustrates a functional configuration of the gaming machine terminal 100 according to the present embodiment. The gaming machine terminal 100 includes the CPU 101 having game control means 201, operation-instruction-mark output means 202, and evaluation means 203. The gaming machine terminal 100 includes the ROM 103 having an operation sequence data table 211, output-form storage means 212, and an association table 213. The CPU 101 of the gaming machine terminal 100 uses the means and tables to implement the game and evaluate a game score which is displayed on the second area 106b of the display unit 106.

(3-1) ROM (Operation Sequence Data Table)

FIG. 7(a) is a schematic view of operation units 114 according to an embodiment, each operation unit 114 having an operation unit number. FIG. 7(b) illustrates an example of operation sequence data stored in the operation sequence data table 211. For ease of illustration, as illustrated in FIG. 7(a), the operation units 114 arranged in four rows and four columns of the present embodiment are referred to as operation units No. 1 to No. 16 respectively. The first area 106a of the display unit 106 is divided into sub-areas Nos. 1 to 16 corresponding to the operation units Nos. 1 to 16 respectively.

The operation sequence data table 211 stores a plurality of operation sequence data for each operation sequence ID. The operation sequence ID is an identifier for each operation sequence data. As illustrated in FIG. 7(b), the operation sequence data defines an operation unit 114 to be operated for an input (as a target) and the input timing to operate the operation unit 114. Specifically, the operation sequence data stores a flag in association with a "time" for each operation unit number. The flag "1" means ON, whereas the flag "0" means OFF. For example, the operation unit No. 1 has the flag 1 at the time t3, and thereby the display unit 106 outputs an operation instruction mark at the sub-area No. 1 for an input operation of the operation unit No. 1 at the time t3. The operation units No. 1 and No. 2 both have a flag 1 at the time t5, and thereby the display unit 106 outputs an operation instruction mark at the sub-areas No. 1 and No. 2 for an input operation of the operation units No. 1 and No. 2 at one time at the time t5. The operation unit No. 1 has a flag 1 at the time t14, and the operation unit No. 2 has a flag 1 at the time t15, and thereby the display unit 106 outputs operation instruction marks respectively at the sub-areas No. 1 and No. 2 for an input operation of the operation units No. 1 and No. 2 at the times t14 and t15 which are close to one another. In the above description, only two operation units 114 of the operation units No. 1 and No. 2 are picked up, but operation instruction marks can be output so that three or more operation units 114 in a vertical, horizontal, or diagonal direction and so on are operated at one timing or at timings close to one another.

(Output-Form Storage Means)

The output-form storage means 212 stores various output-forms (and shapes) for displaying the operation instruction mark. The output-forms each define a manner to change and display a form of an operation instruction mark to inform a player of an input timing of the operation units 114. FIG. 8 illustrates an example of the output-form storage means 212. The output-form storage means 212 stores a program file for outputting an operation instruction mark based on the output-form, for each output-form ID. The output-form ID is an identifier for each of the output-forms.

An operation instruction mark is output based on the output-form as follows. For example, an operation instruction mark includes combinations of a plurality of display patterns. Each display pattern is output in steps a predetermined period of time ta before the input timing, so that the operation instruction mark is controlled to change the form little by little. A display pattern is a part of the operation instruction mark, and is a form displayed in for example colors, designs, characters, symbols, and a combination thereof. The form may be displayed using various levels of brightness and color saturation and so on. For such outputs of the display patterns, the program file for output-form contains, for example, definitions of a plurality of patterns, orders to display the display patterns, intervals to display the display patterns, and a predetermined period of time ta before an input timing that defines an output trigger of a display pattern. The plurality of display patterns may be stored in separate storage means, so that a display pattern is read from the storage means for execution of the program file.

The output of the operation instruction mark may be controlled after the input timing for a predetermined period of time tb, to continue to change the form little by little. In this case, the program file further contains the definition of the predetermined period of time tb after the input timing that defines end of the output of the display pattern.

(Association Table)

FIG. 9 illustrates an example of the association table 213. The association table 213 contains records each associated with a difficulty level, an operation sequence ID, and an output-form ID of the game.

(3-2) Functions of CPU (Game Controlling Means)

A game controlling means 201 reads personal data from a magnetic card inserted into the card reader/writer, prior to implementation of the game. The personal data contains game scores a player already have.

The game controlling means 201 accepts a difficulty level of the game by way of the external input/output control unit 109 from a player using the operation units 114, and determines operation sequence data according to the accepted difficulty level.

Figure 10:
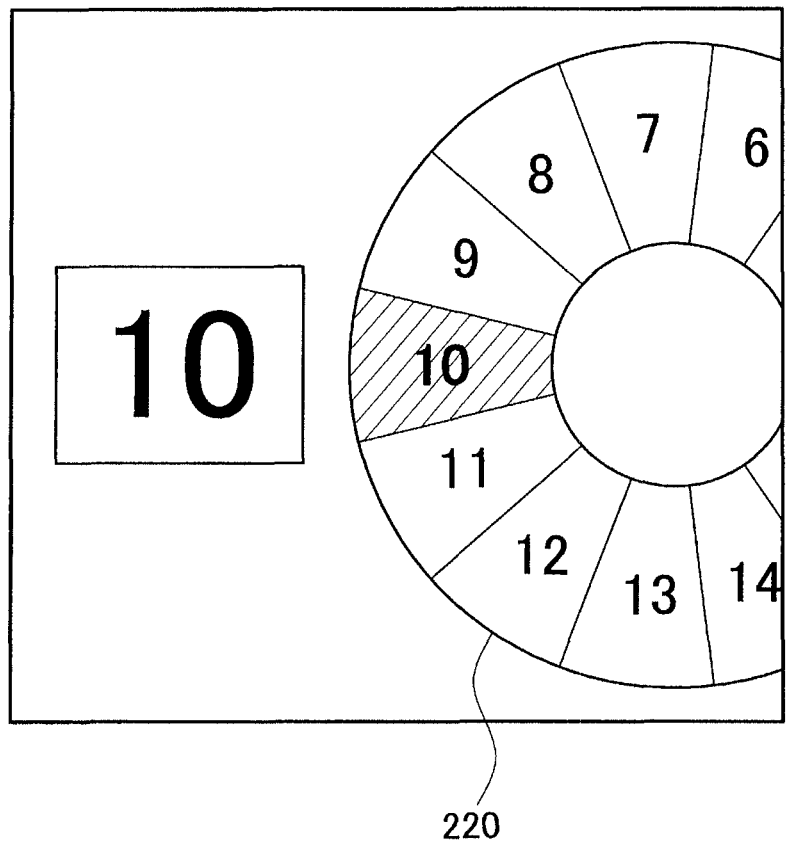
FIG. 10 illustrates an example of a difficulty level selection screen.

FIG. 10 illustrates an example of a difficulty level selection screen. The game controlling means 201 displays the difficulty level selection screen illustrated in FIG. 10 on the second area 106b of the display unit 106. The ring-shaped table 220 contains difficulty levels of the game in sequence. A player scrolls the ring-shaped table 220 by operating a predetermined operation unit 114, and presses down a selection button which is one of the operation units 114 at a desired difficulty level of the game. The game controlling means 201 in this way accepts the difficulty level of the game from the player. In FIG. 10, the difficulty level "10" of the game is selected and displayed in the enlarged image. The game controlling means 201 determines operation sequence data based on the accepted difficulty level of the game and the association table in FIG. 9.

Alternatively, the game controlling means 201 may have an association table between game scores and operation sequence IDs in advance, to determine operation sequence data corresponding to the game score the player already have.

The game controlling means 201 receives an input operation from the player through the external input/output control unit 109. Then, the game controlling means 201 outputs image effects onto the display unit 106 or sound effects from the speaker 108, based on the progress of the game and input operations from the player. The game controlling means 201 also perform various processes for displaying a game score, determining a game end, checking a game continuation, and the like.

(Operation-Instruction-Mark Outputting Means)

The operation-instruction-mark output means 202 receives a difficulty level of the game from the game controlling means 201. The operation-instruction-mark output means 202 determines an operation sequence ID and an output-form ID corresponding to the difficulty level received from the game controlling means 201, based on the association table 213 in FIG. 9. The operation-instruction-mark output means 202 extracts operation sequence data corresponding to the operation sequence ID, from the operation sequence data table 211. The operation-instruction-mark output means 202 also extracts a program file corresponding to the output-form ID, from the output-form storage means 212. The operation-instruction-mark output means 202 displays an operation instruction mark on a sub-area corresponding to each of the operation units 114, based on the operation sequence data and the program file for output-form. At this point, the operation instruction mark is displayed in a form that changes little by little for a predetermined period of time to until the input timing.

Figure 11:
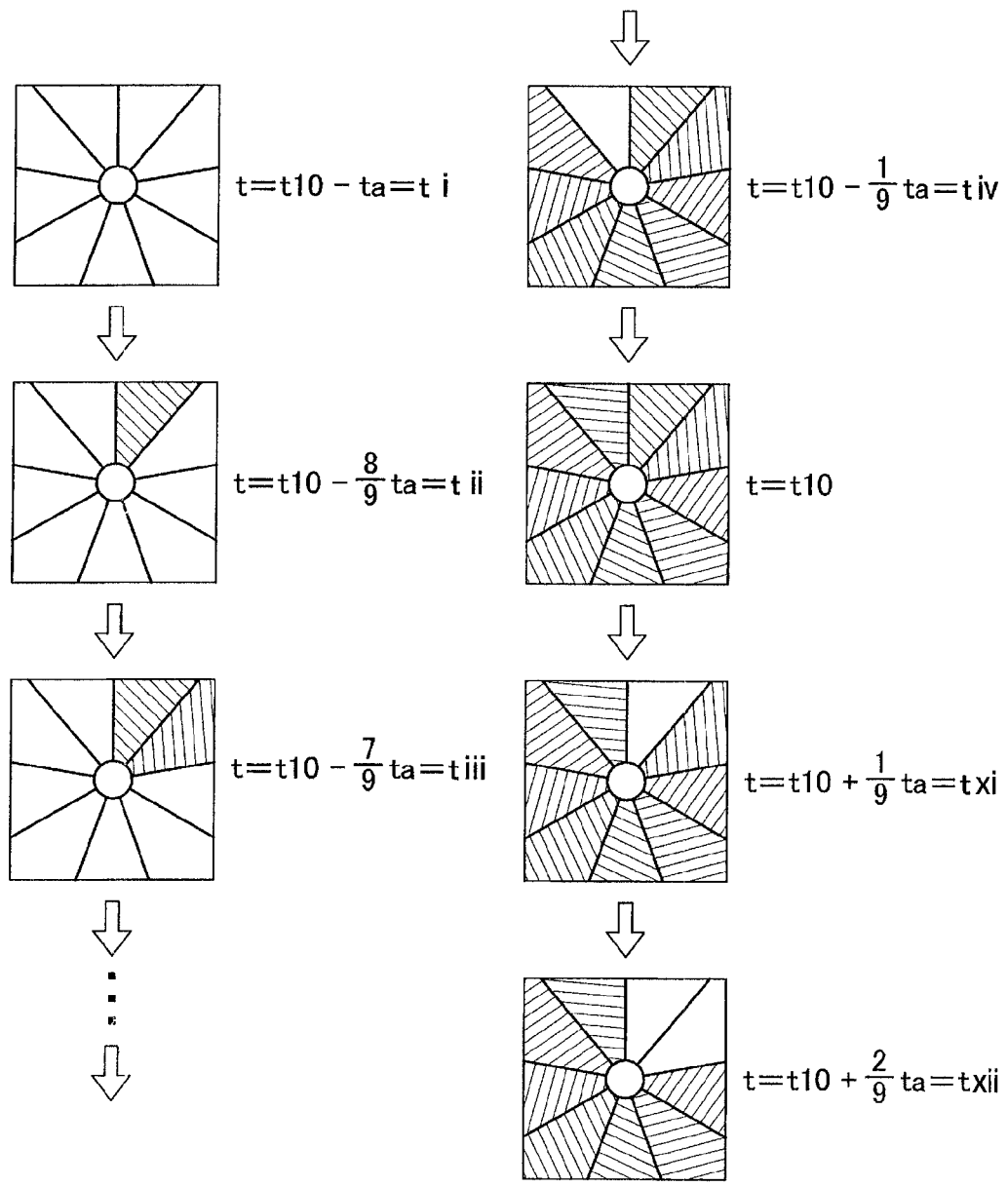
FIG. 11 illustrates an example of a method for displaying an operation instruction mark (1).
Figure 12:
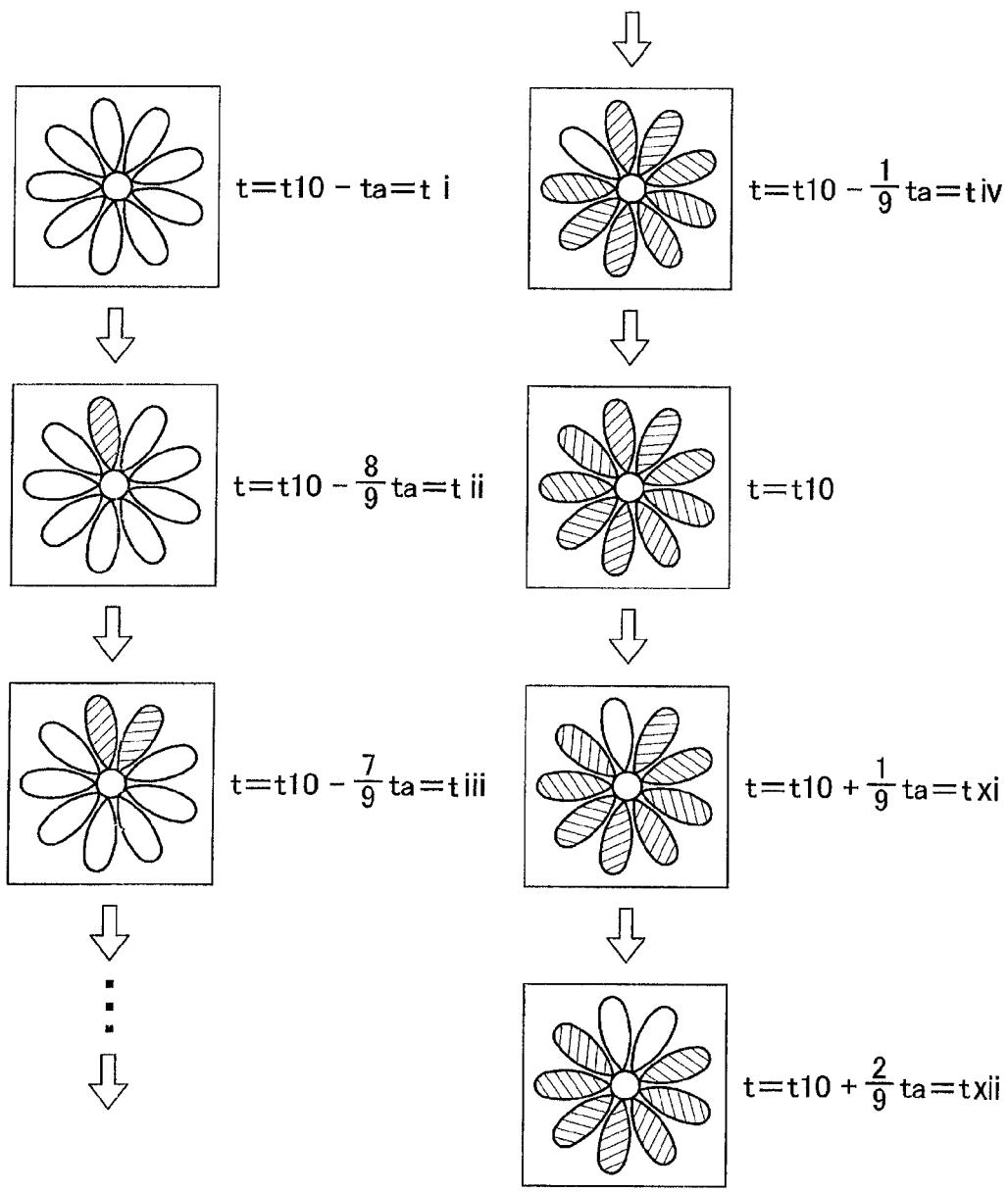
FIG. 12 illustrates another example of a method for displaying an operation instruction mark (2).
Figure 13:
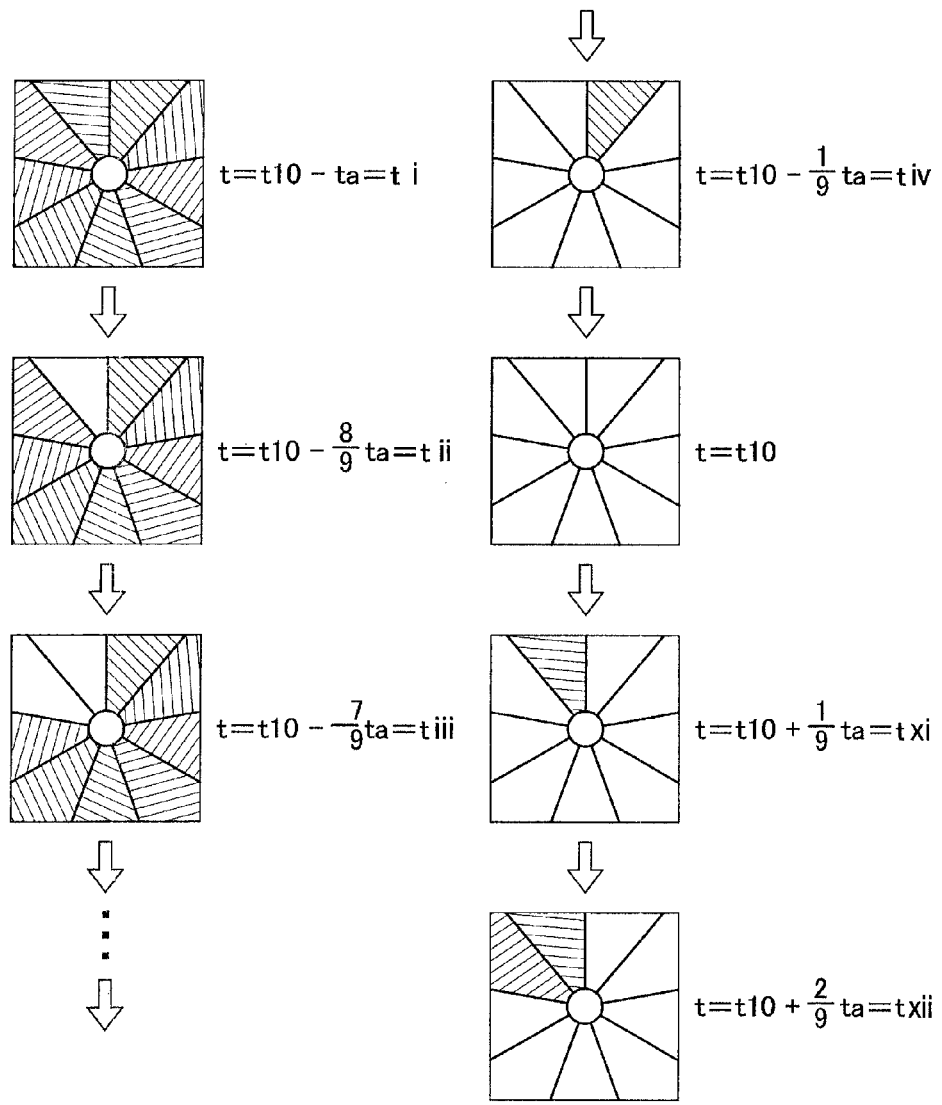
FIG. 13 illustrates the other example of a method for displaying an operation instruction mark (3).

FIGS. 11 to 13 illustrate examples of methods for displaying operation instruction marks. An example will be used below for description, in which an input-timing for an operation unit 114 is defined as a time t=t10 in the operation sequence table.

FIG. 11 is described first. In FIG. 11, one sub-area is divided into nine areas, and a display pattern is output to each area. The area defines the boundary of each display pattern. The display interval between the outputs of display patterns from one area to another area is expressed by: (Display Interval)=(Predetermined Period of Time ta)/(Number of Divisions). Herein, the program files contains definitions of, for example, the number of divisions which is the number of areas obtained by dividing a sub-area, a display pattern displayed on each area, the order and display interval to display the display patterns on each area, a predetermined period of time ta before an input timing that defines an output trigger of a display pattern.

The operation-instruction-mark output means 202 divides a sub-area corresponding to one operation unit 114 into nine areas by a dividing line at a time t=t10−ta=ti, a predetermined period of time ta before the time t=t10. Then, the operation-instruction-mark output means 202 outputs a display pattern to a first area of the divided areas at a time t=t10−(8/9)ta=tii. The operation-instruction-mark output means 202 outputs a display pattern to a second area at a time t=t10−(7/9) ta=tiii. Serially, the operation-instruction-mark output means 202 outputs display patterns to subsequent areas at a time t=t10−(6/9) ta=tiv, a time t=t10−(5/9) ta=tv, up to a time t=t10. In this way, at the timings when the display patterns are output to all of the areas, the input timing of the operation unit 114 corresponding to the sub-area is visually presented to the player.

The operation-instruction-mark output means 202 may subsequently control the output of the operation instruction mark after the input timing for a predetermined period of time tb. As illustrated in FIG. 11, the operation-instruction-mark output means 202 deletes the display pattern at the first area at a time t=t10+(1/9)ta=txi, and deletes the display pattern at the second area at a time t=t10+(2/9) ta=txii. Herein, the following equation is used: (Predetermined Period of Time tb)=(2/9)(Predetermined Period of Time ta). Since the form of an operation instruction mark is changed little by little even after the input timing, when an operation timing by a player is made after the input timing, the player can know how late the operation timing was for the input timing.

FIG. 12 is described now. In FIG. 12, one sub-area is divided into nine areas, and a display pattern is output to each area. The method for outputting a display pattern to each area is similar to that described with reference to FIG. 11 in the respect that display patterns are output to the areas in steps to visually present an input timing to a player, which is not described below.

The display method illustrated in FIG. 13 and those in FIGS. 11 and 12 differ in the respect that the display patterns are output to the areas in steps until an input timing or the display patterns are deleted from the areas in steps. In FIG. 13, the operation-instruction-mark output means 202 displays display patterns at all of the nine areas at the time t=t10−ta=ti, a predetermined period of time ta before the time t=t10. The operation-instruction-mark output means 202 deletes the display patterns serially from the areas at the time t=t10−(8/9)ta=tii, the time t=t10−(7/9) ta=tiii, up to the time t=t10. At the timing when the display patterns are deleted from all of the areas, the input timing of the operation unit 114 corresponding to the sub-area is visually presented to the player. The operation-instruction-mark output means 202 may subsequently control the output of the operation instruction mark after the input timing for a predetermined period of time tb.

As described above, the change in the form of operation instruction mark for a predetermined period of time to before an input timing allows a player to estimate the timing to operate the operation unit 114 for input (timing for hitting the target). The subsequent outputs of adjacent display patterns facilitate the player to know the waiting time until the input timing. The display patterns, however, may be randomly output, different from the case where adjacent display patterns are subsequently output.

Alternatively, the first step of displaying areas by drawing dividing lines shown in FIGS. 11 and 12 may be omitted.

Also, the display patterns may be displayed one by one to form an operation instruction mark without displaying the areas. In the case where an operation instruction mark is composed of five display patterns, display patterns are output in steps to present an input timing to a player. The display interval between the outputs of display patterns is expressed by: (Display Interval)=(Predetermined Period of Time ta)/(Number of Display Patterns Constituting the Operation instruction Mark).

Any method for outputting an operation instruction mark, not limited to those illustrated in FIGS. 11 to 13, may be used in which the form of the operation instruction mark is changed gradually.

(Evaluation Means)

A player checks the operation instruction mark displayed in the sub-areas within the display area of the display unit 106 through surface of the operation unit 114. The player performs an input operation by pressing down or hitting the operation units 114 corresponding to the sub-area with the operation instruction mark, in response to displaying of the operation instruction mark. The player must then performs the input operation (pressing or hitting) the corresponding operation unit 114 (the target) during a predetermined period of time to before the input timing or a predetermined period of time tb after the input timing.

The pressing, hitting or press-down of the operation unit 114 by the player causes the lower rubber contact 122 illustrated in FIG. 4 to be brought into contact with the contacts 124a. The contact generates a signal which is transferred to the CPU 101 via the external device control unit 110 and the external input/output control unit 109. Then the evaluation means 203 obtains information about which operation unit 114 was pressed down and the operation timing of the operation units 114.

The evaluation means 203 determines an operation sequence ID corresponding to the difficulty level received from the game controlling means 201, based on the association table 213 in FIG. 9. The evaluation means 203 refers to the operation sequence data of the operation sequence ID to evaluate whether or not the operation of the operation unit 114 corresponding to the operation instruction mark was operated, how late the operation timing was from the input timing, and the like. For example, in the case where the operation instruction mark illustrated in FIG. 11 is displayed, a player is instructed to operate the operation unit 114 corresponding to the sub-area with the operation instruction mark for input at the time t=t10. The evaluation means 203 determines whether or not the operation unit 114 was operated, and evaluates the difference between the operation timing when the operation unit 114 was operated and the time t=t10 in FIG. 11. The evaluation means 203 computes a game score of the player based on the evaluation. The game controlling means 201 displays the computed game score on the second area 106a of the display unit 106.

Because a game score is computed in the light of the difference between the input timing and the operation timing with respect to the operation unit 114 a player should perform an input operation, the game score depends on the skill of the player, and thereby the player tries to press or hit the operation unit 114 right at the input timing and can enjoy the game. For example, in the case with a small difference between the input timing and the operation timing (actual player pressing or hitting time), the evaluation means 203 determines that the player could appropriately respond to the operation indicting mark, and gives the player a high score. If a higher score is set for a higher difficulty level of the game, the evaluation means 203 computes a game score according to a difficulty level of the game.

The evaluation means 203 may evaluate a game score of a player in the case with an operation timing of the operation unit 114 by the player is during a predetermined period of time ta before the input timing. Because an operation instruction mark is displayed for the predetermined period of time ta before the input timing, the player can estimate the input timing. If, however, the player does not operate the operation unit 114 during the predetermined period of time ta before the input timing, no game score is evaluated. This gives feeling of tension to the player, resulting in enhanced entertainment of the game.

The evaluation means 203 can evaluates a game score of a player even when the operation timing of the operation unit 114 by the player is after the input timing during a predetermined period of time tb. This also gives feeling of tension to the player, resulting in enhanced entertainment of the game.

Alternatively, the evaluation means 203 may set a score corresponding to the output form of an operation instruction mark to evaluate a game score according to the output form.

If a game includes several stages to play, the evaluation means 203 may compute a total game score of each of the stages after the several stages are completed.

The evaluation means 203 transmits the game score to the game controlling means 201 for displaying the game score on the display unit 106.

(4) Process Flow

Figure 14:
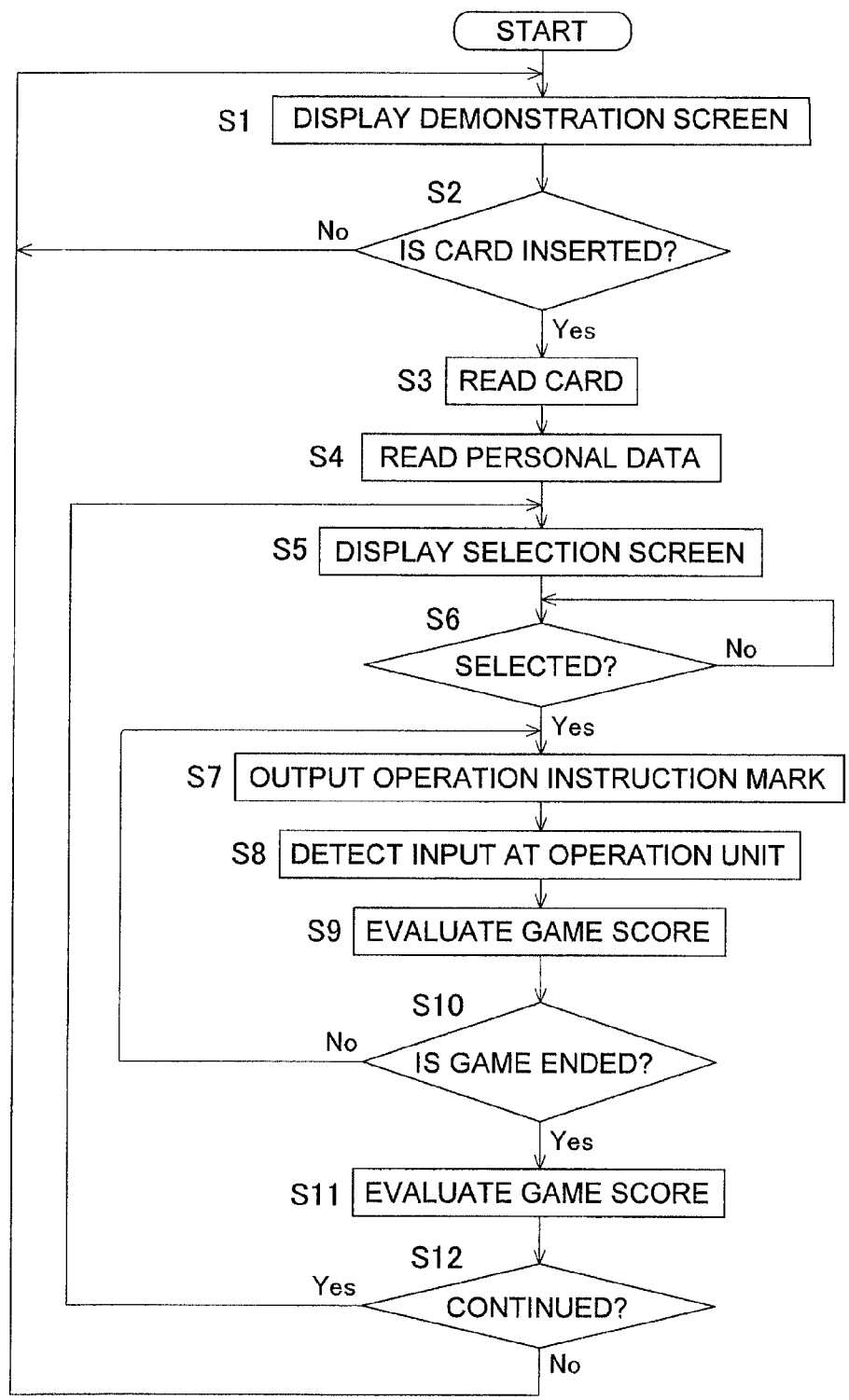
FIG. 14 is a flowchart of processes performed by the gaming machine terminal 100.

FIG. 14 is a flowchart processes performed by the gaming machine terminal 100. When turned on, the gaming machine terminal 100 starts the following processes.

At step S1 to S2: the CPU 101 waits for an instruction to start a game while displaying a demonstration screen (S1). For example, at step (S2), the CPU 101 determines whether or not a coin is dropped in and a magnetic card is inserted to the card reader/writer 112. If a coin is dropped in and a card is inserted, then the process goes to step S3.

At step S3 to S4: the CPU 101 reads in the magnetic card in the card reader/writer 112 (S3), and reads out personal data therefrom (S4).

At step S5 to S6: the CPU 101 displays a difficulty level selection screen on the display unit 106 (S5), and determines a selection of one difficulty level (S6).

At step S7: the CPU 101 determines operation a program file for operation sequence data and an output form according to the difficulty level. The CPU 101 displays an operation instruction mark on a substrate-area corresponding to the operation unit 114 for input operation sequence, based on the sequence data and the program file for output form.

At steps S8 to S10: the CPU 101 detects the input operation (pressing or hitting) using the operation unit 114 by the player (S8), evaluates the operation, and computes a game score (S9). The CPU 101 implements the game to the end (S10).

At step S11: at the end of the game, the CPU 101 displays the game score on the display unit 106.

At step S12: the CPU 101 inquires the player if the player continues the game or not. If yes, the process goes back to step S5 to accept a selection of a difficulty level again, whereas if no, the process goes back to step S1 to display the demonstration screen.

(5) Advantages

According to the present invention, the gaming machine indicates a waiting time to an input timing by changing a form of an operation instruction mark for a predetermined period of time to before the input timing. This allows a player to estimate the timing to operate the operation unit 114, and thereby the player can enjoy matching between the operation timing with the input timing.

Because the operation instruction mark is displayed in a gradually changing form, and thereby a player can enjoy the change in the form of the operation instruction mark, in addition to check the operation instruction mark. For example, an area of an operation instruction mark to be displayed is increased as the input timing (the optimal hitting or pressing time) is approaching. In this case, a player can expect the input timing based on the time when the operation instruction mark has a maximum display area. Alternatively, the operation instruction mark may have a decreasing display area as the input timing is approaching. Otherwise, the operation instruction mark may change into a predetermined form until the input timing.

The display of the display unit 106 where the operation instruction mark is output is visible through the operation units 114. Accordingly, a player can check an operation instruction mark and press or hit (operate) the operation unit 114 in series without moving the player's line of sight.

According to the present invention, as described above, a player can estimate when to press or hit an operation unit 114 and determine an input timing to press or hit the operation unit 114, and can press or hit the operation unit 114 without moving the player's line of sight. Therefore, even if the number of the operation units 114 is increased, a play can follow the game, and does not lose interest to the game. Rather, the increase in the number of the operation units 114 as targets leads to diversity of the game, enhancing the interest of the player to the game. In this way, according to the present invention, the gaming machine has advantages of increased number of the operation units 114 as targets while overcoming the disadvantages thereof.

In addition, the operation instruction marks are displayed to a plurality of sub-areas to make a player to press or hit a plurality of operation units 114 at one timing, and thereby a new entertainment of the operation of the plurality of operation units 114 simultaneously is provided.

Furthermore, a player performs an input operation by pressing down, hitting or striking an operation units 114, and thereby the player can enjoy the actual feeling of operating the operation unit 114 according to the progression of the game. The actual feeling of pressing makes it more certain that the player is pressing or hitting a plurality of operation units 114 when the player should press or hit the plurality of operation units 114 simultaneously. Similarly, the actual feeling of pressing makes it more certain for the player that he/she is operating a plurality of operation units 114 when the player should operate the plurality of operation units 114 at times close to one another.

Other Embodiment

(a) First Modified Embodiment

In the above embodiment, the output of an operation instruction mark is controlled for a predetermined period of time ta before an input timing and for a predetermined period of time tb after the input timing. In the present modified embodiment, the predetermined periods of time ta and tb are changed according to a predetermined parameter. The predetermined parameter includes, but not limited to, a position of an operation unit 114 in an arrangement, and a difficulty level.

Figure 15:
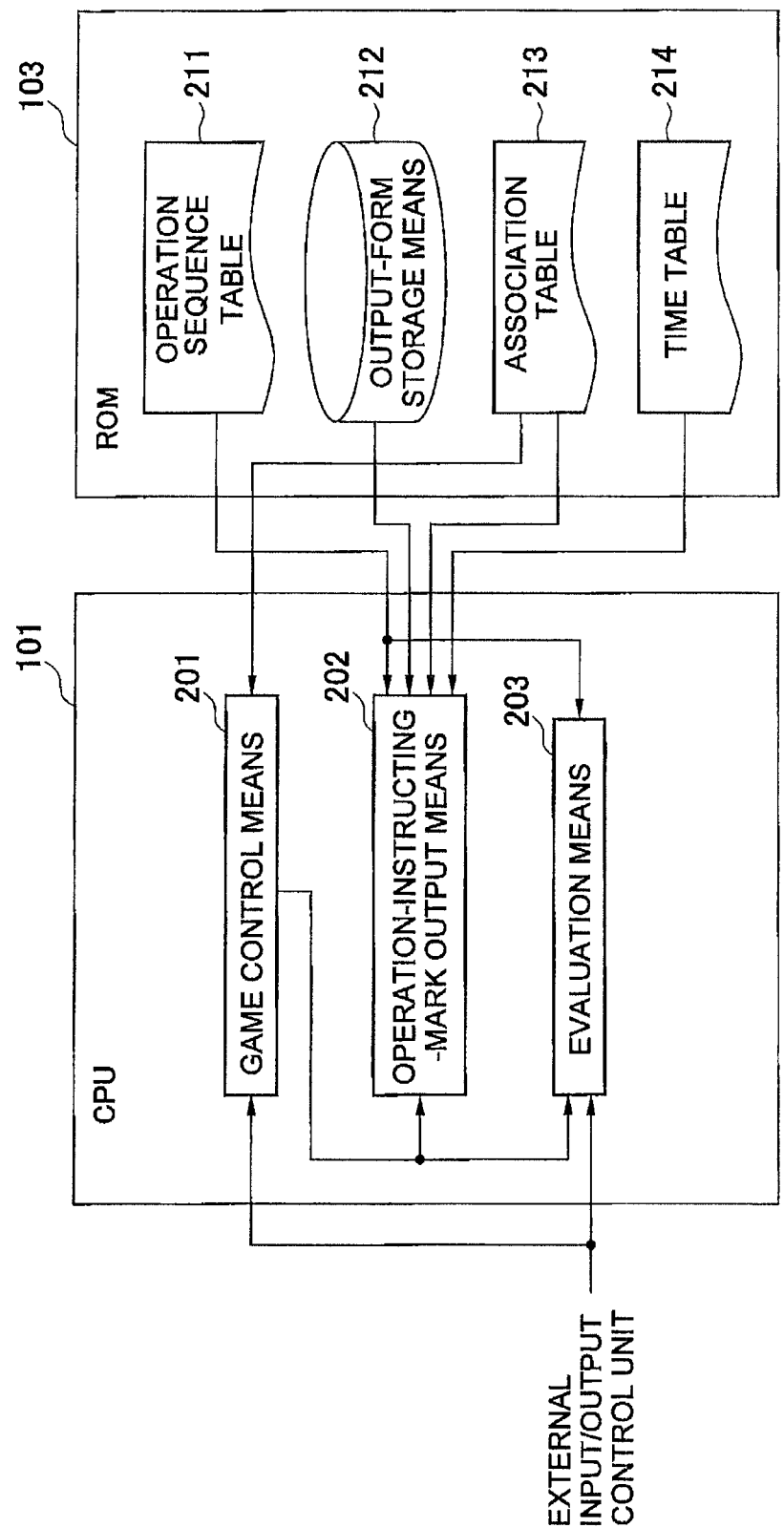
FIG. 15 illustrates a functional configuration of the gaming machine terminal 100 according to a modified embodiment of the present invention.

FIG. 15 illustrates a functional configuration of a gaming machine terminal 100 according to the present modified embodiment of the present invention. The gaming machine terminal 100 illustrated in FIG. 15 further includes a time table 214 in addition to the functional configuration of FIG. 6. FIGS. 16 and 17 illustrate examples of the time table 214. The other configuration is similar to those of the above embodiment, which will not be described below.

(Time Table)

(i) Position of an Operation Unit in an Arrangement and Predetermined Periods of Time ta and tb In the time table of FIG. 16, the operation unit numbers are associated with the predetermined periods of time ta and tb. The operation unit numbers are respectively assigned to the operation units 114 and indicate the positions of the operation units 114 in the arrangement. The centrally positioned operation units 114 of the operation unit No. 1 to 4 have smaller predetermined periods of time ta and tb. The operation units 114 of the operation unit No. 5, 8, 11 and 14 on the corners have larger predetermined periods of time ta and tb.

The operation-instruction-mark output means 202 displays an operation instruction mark on a sub-area corresponding to the operation units 114 to be a target to be pressed or hit (operated for input), based on the operation sequence data and the program file for output-form. At this point, the operation-instruction-mark output means 202 refers to the time table 214, and determines the predetermined periods of time ta and tb based on the positions of the operation unit 114 to be targets to be pressed or hit. The operation-instruction-mark output means 202 implements the program file using the predetermined periods of time ta and tb, and displays the operation instruction mark on a corresponding sub-area by following the operation sequence data.

It is more difficult for a player to check the position of the operation units 114 away from the center of the player's line of sight and the input-timing thereof than in the case of the operation units 114 around the center of the player's line of sight. Therefore, the longer predetermined period of time ta and/or the longer predetermined period of time tb is set for the operation units 114 farther away from the center of the player's line of sight. This allows a player to press or hit (operate) the operation units 114 away from the center of the player's line of sight comparably to the operation units 114 around the center of the player's line of sight.

Because the predetermined period of time ta differs for each operation unit 114, the input timing of an operation unit 114 with an operation instruction mark that is output later may be before the timing of the operation unit 114 with an operation instruction mark that is output earlier. This changes the game, which is simple with input operations (pressing or hitting) of the operation units 114 according to the order of the output operation instruction marks, into a game with a new element that requires consideration of the predetermined period of time ta that differs for each operation unit 114. A player needs to pay more attention to the input timing of each operation unit 114 than in the case where the predetermined period of time ta is identical to all of the operation units 114. This provides for a player feeling of tension to the game, and enhances the interest of the player to the game.

(ii) Difficulty Level of Game and Predetermined Periods of Time ta and tb

The time table in FIG. 17 associates a difficulty level of the game with a predetermined period of time ta and a predetermined period of time tb. In FIG. 17, a larger number is associated with a higher difficulty level of the game, and a higher difficulty level of the game is associated with shorter predetermined periods of time ta and tb. The operation-instruction-mark output means 202 refers to the time table 214, and determines the predetermined periods of time ta and tb according to a difficulty level of the game. Then, the operation-instruction-mark output means 202 implements a program file based on the determined predetermined periods of time ta and tb, and displays an operation instruction mark onto an appropriate sub-area according to the operation sequence data.

A higher difficulty level of the game with a shorter predetermined period of time ta results in a shorter waiting time from the display of an operation instruction mark until the input timing. In addition, a shorter predetermined period of time tb results in a shorter period of time for the display of the operation instruction mark after the input timing, and a shorter period of time for operating the operation unit 114 for input. This increases sense of tension of a player, and the diversity of the game, enhancing the interest of a player to the game.

(iii) Others

In the above description (i) and (ii), only one of the predetermined period of time ta and the predetermined period of time tb needs to be changed, and changes in both predetermined periods of time are not required.

In the above description (i) and (ii), the predetermined periods of time ta and tb are set according to predetermined parameters. A function to change the predetermined periods of time ta and tb are set according to predetermined parameters may be stored in the ROM 103. In this case, the operation-instruction-mark output means 202 uses the function to determine the predetermined periods of time ta and tb according to predetermined parameters, and display operation instruction marks.

Alternatively, in contrast to the above description (i), regardless of the position in an arrangement, a predetermined period of time ta and/or a predetermined period of time tb may be simply determined for each operation unit 114. This also provides variation in input timings, and the diversity of the game, enhancing the interest of a player to the game.

Otherwise, the operation unit 114 having a high matching degree between an input timing and an operation timing may be detected to decrease the predetermined period of time ta for the operation unit 114 during the output of subsequent operation instruction marks. For example, the ROM 103 stores an association table that associates a matching degree between an input timing and an operation timing with a predetermined period of time ta. After the game starts, the evaluation means 203 computes the matching degree of an input timing and an operation timing for each operation unit 114. For a matching degree above a predetermined value, in other words, in the case where a difference between an input timing and an operation timing (player pressing or hitting) is within a predetermined range, the evaluation means 203 extracts a predetermined period of time ta corresponding to the matching degree from the table. The operation-instruction-mark output means 202 implements a program file based on the predetermined period of time ta, and displays an operation instruction mark onto an appropriate sub-area according to the operation sequence data. The operation of the operation unit 114 a player could easily operate before turns to be difficult due to the decreased predetermined period of time ta. This increases sense of tension of a player, and the diversity of the game, enhancing the interest of a player to the game. Similarly, the predetermined period of time tb may be changed depending on a matching degree.

The predetermined period of time ta and/or a predetermined period of time tb may be changed during the game at any time, to provide sense of tension of a player.

In addition, a game score may be evaluated based on a score system in which a player can obtain a higher score through input operations (pressing and/or hitting) of the operation units 114 during a shorter predetermined period of time ta and a shorter predetermined period of time tb.

(b) Second Modified Embodiment

Figure 18:
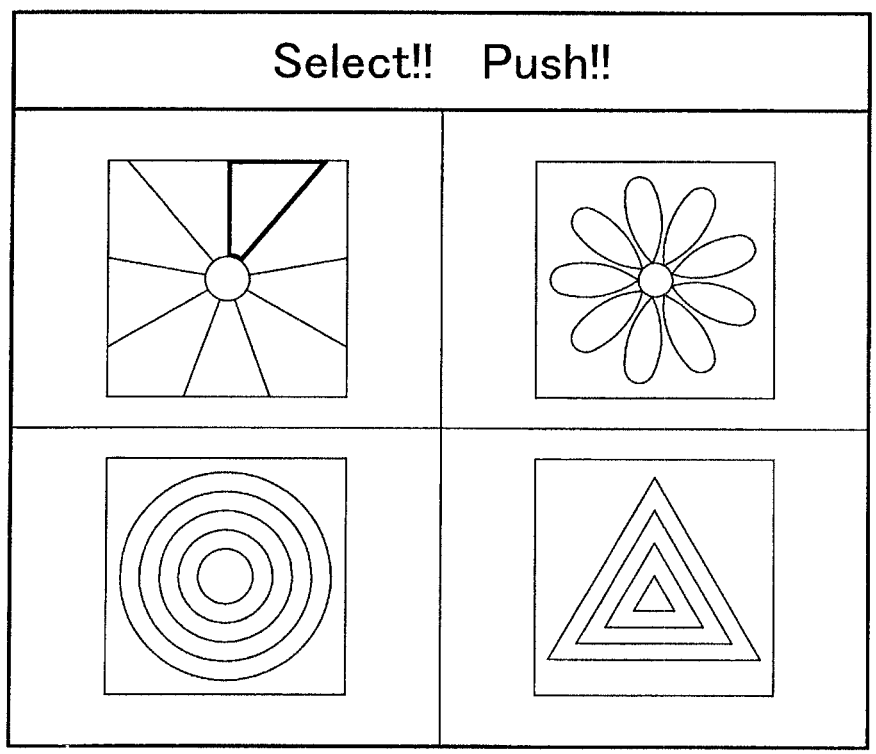
FIG. 18 illustrates a selection screen for an output-form.

In the above embodiment, the gaming machine terminal 100 determines the output-form of an operation instruction mark. In this modified embodiment, a player can select the output-form. FIG. 18 illustrates an output-form selection screen. The game controlling means 201 displays the difficulty level selection screen in FIG. 18 onto the second area 106*b* of the display unit 106. A player presses down a selection button which is one of the operation units 114 at a desired output-form, through operation of the predetermined operation unit 114. The operation-instruction-mark output means 202 outputs an operation instruction mark based on the output-form determined by the player.

(c) Third Modified Embodiment

Figure 19:
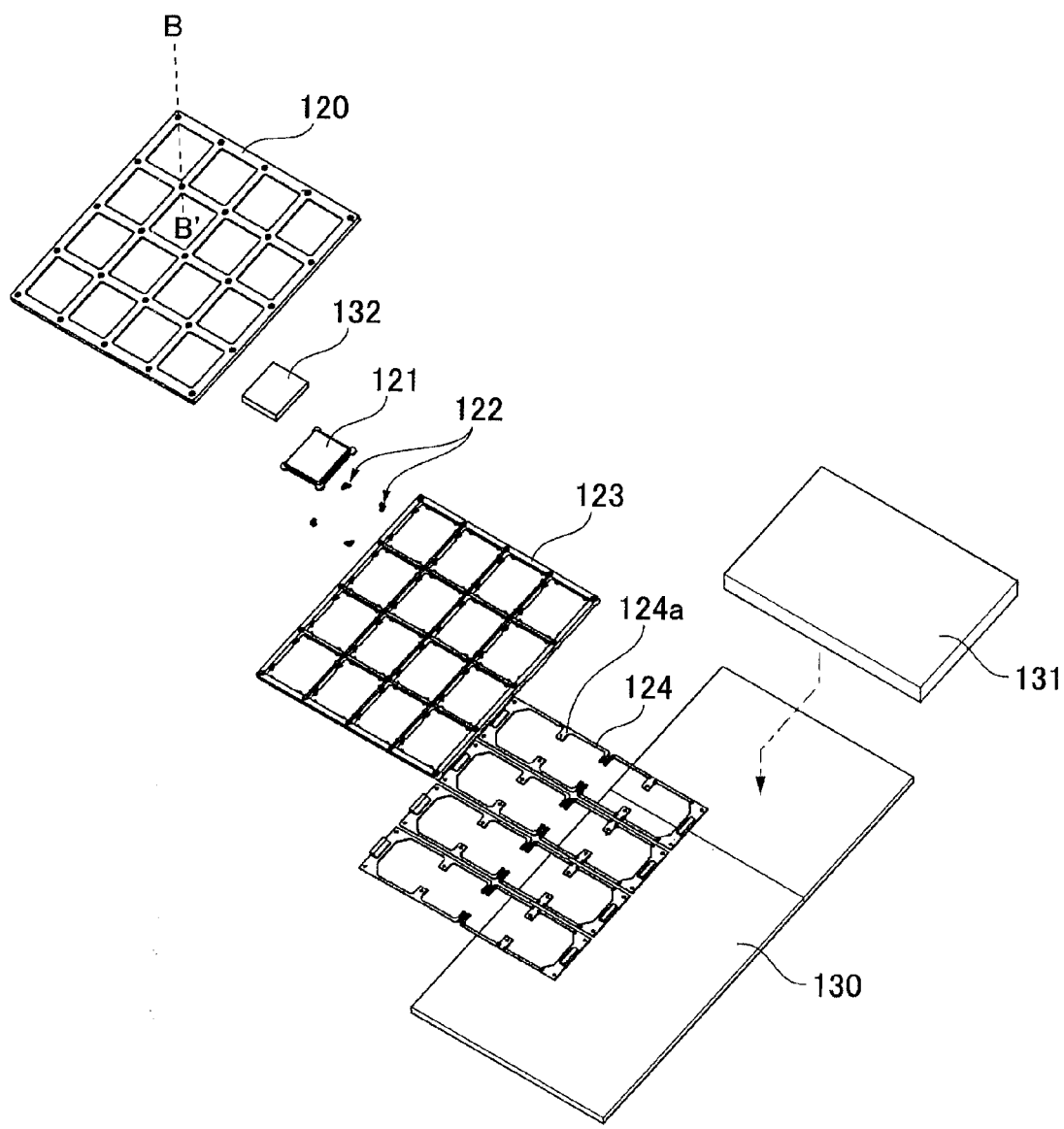
FIG. 19 is an exploded perspective view of an operation unit and a display unit.
Figure 20:
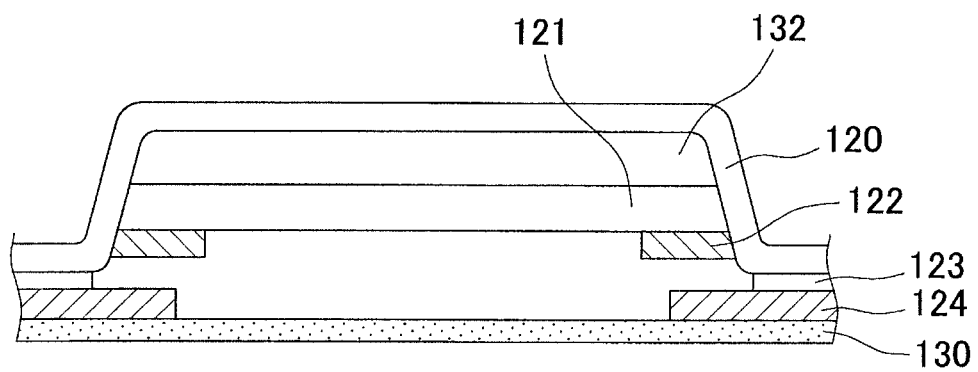
FIG. 20 is a cross-sectional view along the line B-B' in FIG. 19.

FIG. 19 is an exploded perspective view of an operation unit and a display unit, whereas FIG. 20 is a cross-sectional view along the line B-B' in FIG. 19. In the above embodiment, a plurality of operation units 114 are provided on one display unit 106. As illustrated in FIGS. 19 and 20, however, each display unit 132 may be provided on the button 121 which is an operation unit 114.

As one or more operation units 114, one or more press-type buttons 121 are provided. On each of the buttons 121, a display unit 132 of a size similar to that of the button 121 is provided. An operation instruction mark is displayed on the display unit 132 as in the above embodiment. The button 121 and the display unit 132 are sandwiched between upper rubber contacts 120 and lower rubber contacts 122. Under the button 121, a frame 123, substrate 124, and a base plate 130 are provided in sequence. The base plate 130 is also provided with a display unit 131 to display decorative lights during a game, a game score, and demonstration display and display for selecting a difficulty level.

A player checks the operation instruction mark displayed in display unit 132 through the button 121 which is an operation unit 114. The player performs an input operation by pressing down the display unit 132 with the operation instruction mark and the corresponding operation units 114, in response to the operation instruction mark while the operation instruction mark is displayed.

In the present modified embodiment, the display unit 132 is provided on each of the operation units 114, and the display unit 132 and the operation unit 114 can be integrally formed. Accordingly, a player feels like operating the operation units 114 while operating the display unit 132, as a new feeling experience.

(d) Fourth Modified Embodiment

Figure 21:
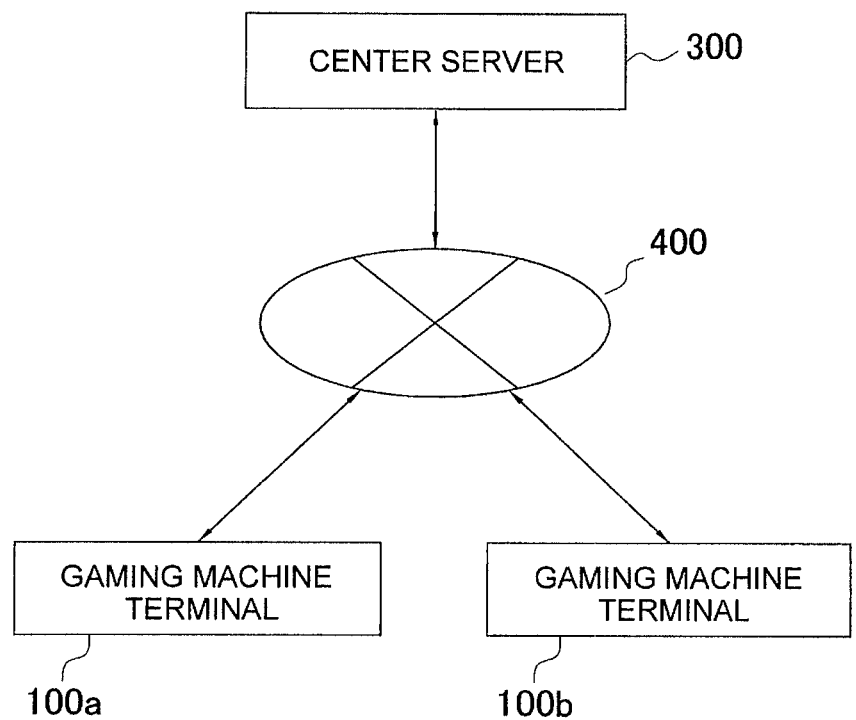
FIG. 21 illustrates a configuration of a network according to a modified embodiment of the present invention.

FIG. 21 illustrates a configuration of a network according to the present modified embodiment. A plurality of gaming machine terminals 100 may be connected to a center server 300 via a network 400. The center server 300 manages personal data such as game scores, and receives and aggregates various data from each of the gaming machine terminal 100.

For example, each gaming machine terminal 100 receives a selection of a game based on a selection of a song by a player, and transmits the selection to the center server 300. The center server 300 aggregates the information to check if the same game is selected at the same time to send the result to the gaming machine terminal 100. For example, in the case where the same game is already selected at the same time at one gaming machine terminal 100, the center server 300 displays the scenes of the on-going game being implemented on the gaming machine terminal 100 on the display units 106 of the other gaming machine terminals 100. Players can understand the existence of another player who is playing the same game, and share the game with the player.

(e) Fifth Modified Embodiment

In the above embodiment, each square operation unit 114 has four lower rubber contacts 122 at each corner thereof. Two or more lower rubber contacts 122 are required to accommodate for the angles at which the operation unit 114 is pressed down, and the number and positions of the lower rubber contacts 122 are not limited to those described above.

When a player presses down one operation unit 114, the operation unit 114 may be lowered vertically or may be lowered at an angle. The plurality of lower rubber contacts 122 each corresponding to the inclination of the operation unit 114 enables accurate detection of the operations of the operation units 114 by the player.

(f) Sixth Modified Embodiment

In the above embodiment, a display interval is defined by the equations: (Display Interval)=(Predetermined Period of Time ta)/(Number of Divisions), and (Display Interval)= (Predetermined Period of Time ta)/(Number of Display Patterns). The display intervals, however, are not limited to those, and a display interval before an input timing may be different from that after the input timing. Alternatively, the display interval may not be constant: for example, the display interval may become shorter as an input timing is approaching. Such variation in the display interval makes the waiting time until the input timing unpredictable. This increases sense of tension of a player, and the diversity of the game, enhancing the interest of a player to the game.

(g) Seventh Modified Embodiment

The number of division of a sub-areas and the number of display patterns constituting an operation instruction mark may be changed depending on a difficulty level of a game.

(h) Eighth Modified Embodiment

Any program for implementing the above described method on a computer and any computer-readable record medium in which the program is recorded are within the scope of the present invention. Herein, the program may be a downloadable one. The record medium includes computer-readable/writable flexible disk, a hard disk, a semiconductor memory, a CD-ROM, a DVD, a magneto-optical disc (MO), and the like.

INDUSTRIAL APPLICABILITY

The gaming machine, the gaming method, and the gaming program according to the present invention are applicable to any game that outputs operation instructions to a player.

The invention claimed is:
1. A gaming machine comprising:
an electronic display having a plurality of pressure sensitive areas configured to accept an input operation-performed by a player pressing on at least one of the pressure sensitive areas, each of the pressure sensitive areas having a see-through surface with the electronic display being disposed beneath the pressure sensitive areas, such that the player being able to see-through the see-through surface of the pressure sensitive areas and view the at least a portion of the electronic display;
a controller connected to the electronic display and the pressure sensitive areas; and
a data storage device that stores an operation sequence data table with data corresponding to each of the plurality of pressure sensitive areas and to input timing for the input operations, the data storage device also stores a time table including correspondences between positions of the pressure sensitive areas and predetermined time periods between the input operations, the data storage device further stores a predetermined number i of division areas for each of the plurality of pressure sensitive areas and a predetermined period of time ta before the input timing,
wherein the controller is configured to divide each of the plurality of pressure sensitive areas into the predetermined number i of the division areas stored by the data storage device, calculate a display time t that the controller outputs an operation instruction mark on an i th one of the division areas of a corresponding one of the plurality of pressure sensitive areas, the display time t being calculated as follows:

$$t = tx - (i-ith)/i \times ta$$

tx=is the time it takes for the controller to output operation instruction marks to all of the division areas in the corresponding one of the plurality of pressure sensitive areas,
- i=the total number of division areas that the corresponding one of the plurality of pressure sensitive area is divided into by the controller,
- i th=a sequential number of a division area that the controller outputs operation instruction mark, and
- ta=a predetermined period of time,
- the controller further outputting an operation instruction mark via the electronic display on the i th division area of the corresponding one of the plurality of pressure sensitive areas at the display time t at locations corresponding to predetermined ones of the plurality of the pressure sensitive areas based on data in the operation sequence data table and the time table, the operation instruction mark signaling to the player the input timing that the player should-perform a plurality of the input operations by pressing on the predetermined one of the plurality pressure sensitive areas, and the controller is further configured to detect the operation timing in which the player has performed the plurality of the input operations and evaluate a game score of the player based on comparison between the input timing and the operation timing that corresponds to the moment of the input operations by the player,
- the controller being further configured to start controlling to the electronic display an output of the operation instruction mark at a first predetermined period of time before the input timing, so as to change a form of the operation instruction mark little by little for a center one of the pressure sensitive areas for the first predetermined period of time until the input timing, and
- the controller further being configured to start controlling to the electronic display an output of the operation instruction mark at a second predetermined period of time before the input timing, so as to change a form of the operation instruction mark little by little for the pressure sensitive areas other than the center one of the pressure sensitive areas, the first predetermined period of time being different than the second predetermined period of time.

2. The gaming machine according to claim 1, wherein the controller further controls the output of the operation instruction mark by changing via the electronic display a form of the operation instruction mark gradually even after the input timing for a third predetermined period of time.

3. The gaming machine according to claim 2, wherein the controller evaluates the game score based on a difference between the input timing and the operation timing.

4. The gaming machine according to claim 1, wherein the controller evaluates the game score based on a difference between the input timing and the operation timing.

5. The gaming machine according to claim 4, wherein the controller evaluates the game score based on a difference between the input timing and the operation timing in the case where the operation timing is during the predetermined period of time ta before the input timing.

6. The gaming machine according to claim 1, wherein the operation instruction mark is composed of a combination of display patterns, each pattern being a part of the operation instruction mark, and
the controller changes the form of the operation instruction mark by outputting each of the display patterns in steps to each of a plurality of areas in the electronic display for the predetermined period of time ta until the input timing.

7. The gaming machine according to claim 1, wherein the plurality of the pressure sensitive areas are provided on a top surface of the see-through surface of the electronic display, and the electronic display includes a plurality of display areas each corresponding to each of the plurality of the pressure sensitive areas.

8. The gaming machine according to claim 1 further comprising:
- a plurality of contacts each corresponding to an angle at which corresponding ones of the plurality of the pressure sensitive areas is pressed down;
- a detection substrate disposed under the plurality of the pressure sensitive areas to contact with at least one of the plurality contacts when the corresponding ones of the plurality of the pressure sensitive areas are pressed down, and
- wherein the controller determines whether or not the plurality of the pressure sensitive areas with which the input operation was performed by the player matches with the plurality of the pressure sensitive areas instructed by the operation instruction mark based on a contact between one of the contacts and the detection substrate determines a matching degree between an operation timing of the input operation by the player and the input timing, and evaluates a game score of the player based on the determination result.

9. The gaming machine according to claim 1, wherein the operation-instruction-mark output means sets the first and second predetermined periods of time according to a difficulty level of the game.

10. The gaming machine according to claim 1, wherein the first predetermined period of time is smaller than the second predetermined period of time.

11. A gaming method executed by a gaming machine including
an electronic display having a plurality of pressure sensitive areas, the plurality of pressure sensitive areas accepting an input operation performed by a player by pressing on at least one of the plurality of pressure sensitive areas, each of the pressure sensitive areas having a see-through surface with the electronic display being disposed beneath the pressure sensitive areas such that the player is able to see-through the see-through surfaces of the plurality of pressure sensitive areas and view the at least a portion of the electronic display,
a controller connected to the electronic display and the pressure sensitive areas; and
a data storage device that stores an operation sequence data table with data corresponding to each of the plurality of pressure sensitive areas and to input timing for the input operations, the data storage device also stores a time table including correspondences between positions of the pressure sensitive areas and predetermined time periods between the input operations, the data storage device further storing a predetermined number i of division areas of each the plurality of pressure sensitive areas and a predetermined period of time ta before the input timing, the method comprising:

dividing each of the pressure sensitive areas into the predetermined number i of the division areas stored by the data storage device, calculating a display time t that the controller outputs an operation instruction mark on a i th division area of a corresponding one of the plurality of pressure sensitive areas, the display time t being calculated by the controller as follows:

$$t = tx - (i - ith)/i \times ta$$

tx=is the time it takes for the controller to output operation instruction marks to all of the division areas in the corresponding one of the plurality pressure sensitive areas, i=the total number of division areas that the corresponding one of the plurality of pressure sensitive areas is divided into by the controller, i th=a sequential number of a division area that the controller outputs operation instruction mark, and ta=a predetermined period of time outputting the operation instruction mark via the electronic display on the i th division area of the corresponding one of the plurality of pressure sensitive areas at the display time t, the operation instruction mark signaling an input timing of an input operation for the corresponding one of the plurality of pressure sensitive areas for the player to view based on data in the operation sequence data table and the time table; and evaluating a game score of the player based on comparison between the input timing and an operation timing of the input operation by the player, the operation instruction mark outputting step including:

starting to control to the electronic display an output of the operation instruction mark a first predetermined period of time before the input timing and a second predetermined period of time before the input timing, and controlling the output of a center one of the plurality of pressure sensitive areas and the plurality of pressure sensitive areas other than the center one by changing a form of the operation instruction mark for the center one of the plurality of pressure sensitive areas little by little for the first predetermined period of time and changing a form of the operation instruction mark for the plurality of pressure sensitive areas other than the center one little by little for the second predetermined period of time, the first predetermined period of time being set for the center one of the plurality of pressure sensitive areas and the second predetermined period of time being set for the plurality of pressure sensitive areas other than the center one, the first predetermined period of time being different than the second predetermined period of time.

12. The gaming method according to claim 11, wherein the first predetermined period of time is smaller than the second predetermined period of time.

13. A gaming program stored on a non-transitory computer-readable storage medium executable by a computer terminal including an electronic display having a plurality of pressure sensitive areas that accept an input operation performed by a player pressing on at least one of the pressure sensitive areas and each of the pressure sensitive areas having a see-through surface, with the electronic display being disposed beneath the pressure sensitive areas, such that the player is able to see-through the see-through surface of the pressure sensitive areas and view at least a portion of the electronic display, a controller connected to the electronic display and the pressure sensitive areas; and a data storage device that stores an operation sequence data table with data corresponding to each of the plurality of pressure sensitive areas and to input timing for the input operations, the data storage device also stores a time table including correspondences between positions of the pressure sensitive areas and predetermined time periods between the input operations, the data storage device also stores a predetermined number i of division areas for each of the plurality pressure sensitive areas and a predetermined period of time ta before the input timing, the gaming program causing the computer terminal to operate the controller to divide each of the plurality of pressure sensitive areas to the predetermined number i of the division areas stored in the data storage device, calculate a display time t that the controller outputs an operation instruction mark on a i th division area of a corresponding one of the pressure sensitive areas, the display time t being calculated by the controller as follows:

$$t = tx - (i - ith)/i \times ta$$

tx=is the time it takes for the controller to output operation instruction marks to all of the division areas in the corresponding one of the plurality of pressure sensitive areas, i=the total number of division areas that the corresponding one of the plurality of pressure sensitive areas is divided into by the controller, i_th=a sequential number of a division area that the controller outputs operation instruction mark, and ta=a predetermined period of time the gaming program further causing the computer terminal to operate the controller to produce the operation-instruction-mark via the electronic display on the i th division area of the corresponding one of the plurality of pressure sensitive areas at the display time t, the operation-instruction-mark signaling an input timing to the player such that the player should perform the input operation using the plurality of pressure sensitive areas based on data in the operation sequence data table and the time table, and the gaming program further causing the computer terminal to operate the controller to evaluate a game score of the player based on comparison between the input timing and an operation timing of the input operation performed by the player, the gaming program further causing the computer terminal to operate the controller to begin to control to the electronic display the operation-instruction-mark output to a center one of the plurality of pressure sensitive areas at a first predetermined period of time before the input timing, so as to change a form of the operation instruction mark gradually for the first predetermined period of time until the input timing, and the controller starts to control to the electronic display an output of the operation instruction mark of the plurality of pressure sensitive areas other than the center one at a second predetermined period of time before the input timing, so as to change a form of the operation instruction mark gradually for the second predetermined period of time until the input timing, the first predetermined period of time being different than the second predetermined period of time.

14. The gaming program according to claim 13, wherein the first predetermined period of time is smaller than the second predetermined period of time.

15. A gaming machine comprising:
a plurality of transparent pressure sensitive areas that each accepts an input operation performed by a player when the player presses down on the transparent pressure sensitive areas;
at least one electronic display that is disposed under the pressure sensitive areas and has a display surface that the player can view through the transparent pressure sensitive areas, the electronic display having a plurality of display areas corresponding to corresponding ones of the plurality of the pressure sensitive areas;
a data storage device that stores an operation sequence data table with data corresponding to each of the plurality of pressure sensitive areas and to input timing for the input operations, the data storage device also stores a time table including correspondences between positions of the pressure sensitive areas and predetermined time periods between the input operations, the data storage device also stores a predetermined number i of division areas of each of the plurality of pressure sensitive areas and a predetermined period of time to before the input timing,
a controller connected to the electronic display and the pressure sensitive areas, the controller being configured to divide each of the plurality of pressure sensitive areas into the predetermined number i of the division areas stored by the data storage device, calculate a display time t that the controller outputs an operation instruction mark on a i th area of a corresponding one of the plurality of pressure sensitive areas divided by the controller, the display time t being calculated as follows:

$$t = tx - (i-ith)/i \times ta$$

tx=is the time it takes for the controller to output operation instruction marks to all of the division areas in the corresponding one of the plurality of pressure sensitive areas,
i=the total number of division areas the corresponding one of the plurality of pressure sensitive area is divided into by the controller,
i th=a sequential number of a division area that the controller outputs operation instruction mark, and
ta=a predetermined period of time,
the controller being configured to output operation instruction mark via the electronic display on the i th division area of the corresponding one of the plurality of pressure sensitive areas at the display time t, the operation instruction mark indicating that a selected one of the pressure sensitive areas is a target based on data in the operation sequence data table and the time table, the controller signaling an input timing of the input operation using the each of the pressure sensitive areas;
a plurality of contacts at each of the plurality of pressure sensitive areas;
a detection substrate disposed under the pressure sensitive areas to contact with the contacts when the pressure sensitive areas is pressed down; and
the controller being further configured to determine whether or not the pressure sensitive areas with which the input operation was performed by the player matches with the pressure sensitive areas instructed by the controller and the operation instruction mark based on a contact between one of the contacts and the detection substrate, the controller determining a matching degree between an operation timing of the input operation by the player and the input timing, and evaluates a game score of the player based on the determination result, the controller beginning to control to the electronic display an output of the operation instruction mark to a center one of the pressure sensitive areas at a first predetermined period of time before the input timing, so as to change a form of the operation instruction mark little by little for the first predetermined period of time until the input timing, and the controller beginning to control to the electronic display an output of the operation instruction mark of the pressure sensitive areas other than the center one at a second predetermined period of time before the input timing, so as to change a form of the operation instruction mark gradually for the second predetermined period of time until the input timing, the first predetermined period of time being different than the second predetermined period of time.

16. The gaming machine according to claim 15, wherein the first predetermined period of time is smaller than the second predetermined period of time.

17. A gaming machine comprising
a plurality of pressure sensitive areas that accept an input operation when performed by a player pressing down on the at least one of the pressure sensitive areas, the pressure sensitive areas each having a see-through surface, each of the pressure sensitive areas include a first area that is positioned in a center of the pressure sensitive areas and being set with a first predetermined period as operation timing and a second area that is positioned in other than the center of the pressure sensitive areas and being set with a second predetermined period as operation timing;
at least one electronic display with at least a portion of the electronic display being disposed beneath the plurality of pressure sensitive areas, the player being able to see-through the see-through surface of the pressure sensitive areas and view the at least a portion of the electronic display;
a controller connected to the electronic display and the pressure sensitive areas; and
a data storage device that stores an operation sequence data table with data corresponding to each of the plurality of pressure sensitive areas and to input timing for the input operations, the data storage device also stores a time table including correspondences between positions of the pressure sensitive areas and predetermined time periods between the input operations, the data storage device also stores a predetermined number i of division areas of each of the plurality of pressure sensitive areas and a predetermined period of time to before the input timing,
wherein the controller being configured to divide each of the plurality of pressure sensitive areas to the predetermined number i of the division areas stored by the data storage device, calculate a display time t that the controller outputs an operation instruction mark on an i th one of the division areas of a corresponding one of the plurality of pressure sensitive areas, the display time t being calculated as follows:

$$t = tx - (i-ith)/i \times ta$$

tx=is the time it takes for the controller to output operation instruction marks to all of the division areas in the corresponding one of the plurality of pressure sensitive areas, i=the total number of division areas that the corresponding of the plurality of pressure sensitive areas is divided into by the controller, i th=a sequential number of a division area that the controller outputs operation instruction mark, and ta=a predetermined period of time, and output the operation instruction mark via the electronic display on the i th division area of the corresponding one of the pressure sensitive areas at the display time t, the operation instruction mark signaling to the player an input timing such that the player should perform the input operation using the one of the plurality of pressure sensitive areas based on data in the operation sequence data table and the time table; and the controller being further configured to evaluate a game score of the player based on comparison between the input timing and an operation timing that corresponds to the moment of the input operation by the player, wherein the controller controls to the electronic display an output of the operation instruction mark at the first predetermined period of time before the input timing, so as to change a form of the operation instruction mark little by little for the first predetermined period of time until the input timing for the first area, and controls to the electronic display an output of the operation instruction mark at the second predetermined period of time before the input timing, so as to change a form of the operation instruction mark little by little for the second predetermined period of time until the input timing for the second area.

* * * * *